US012803250B2

(12) United States Patent
Reid et al.

(10) Patent No.: US 12,803,250 B2
(45) Date of Patent: Nov. 17, 2026

(54) MODULAR ELECTRICAL PANELBOARD

(71) Applicant: Span.IO, Inc., San Francisco, CA (US)

(72) Inventors: Nicholas Reid, San Francisco, CA (US); Ryan Carter Kroeze, San Francisco, CA (US); Venkatraghavan Sundararajna, San Francisco, CA (US); Anna Lai, Stanford, CA (US); Cole Hamilton Ashman, San Francisco, CA (US)

(73) Assignee: Span.IO, Inc., San Francisco, CA (US)

( * ) Notice: Subject to any disclaimer, the term of this patent is extended or adjusted under 35 U.S.C. 154(b) by 0 days.

(21) Appl. No.: 18/586,362

(22) Filed: Feb. 23, 2024

(65) Prior Publication Data

US 2025/0096536 A1 Mar. 20, 2025

Related U.S. Application Data

(60) Provisional application No. 63/551,192, filed on Feb. 8, 2024, provisional application No. 63/583,141, filed on Sep. 15, 2023.

(51) Int. Cl.

*H02B 1/20* (2006.01)
*H02B 1/04* (2006.01)
*H02B 1/32* (2006.01)

(52) U.S. Cl.

CPC ............ *H02B 1/202* (2013.01); *H02B 1/042* (2013.01); *H02B 1/32* (2013.01)

(58) Field of Classification Search

CPC .......... H02B 1/202; H02B 1/042; H02B 1/32; H02B 1/20; H02B 1/04; H02B 1/015;

(Continued)

(56) References Cited

U.S. PATENT DOCUMENTS 3,243,663 A * 3/1966 Rowe .................... H02B 1/056 361/637
3,346,777 A * 10/1967 Leonard ................ H02B 1/056 361/825

(Continued)

FOREIGN PATENT DOCUMENTS

WO 2018/098486 A1 5/2018

OTHER PUBLICATIONS

PCT International Search Report and Written Opinion, PCT Application No. PCT/US24/25267, Jul. 24, 2024, 16 pages.

(Continued)

*Primary Examiner* — Rockshana D Chowdury
*Assistant Examiner* — Martin Antonio Asmat Uceda
(74) *Attorney, Agent, or Firm* — Fenwick & West LLP

(57) ABSTRACT

Some embodiments relate to a spine of a chassis (e.g., an electrical panel). The spine includes receiving compartments configured to receive chassis modules, wherein each receiving compartment is formed by: a portion of a panel, a portion of a wall raised from a first edge of the panel and extending along the first edge, portions of two bus bars spaced apart from each other and fixed to the panel; and one or more guiding structures extending from a surface of the first wall, where the guiding structures configured to (a) engage with chassis modules and (b) prevent the received chassis modules from sliding into an adjacent receiving compartment.

18 Claims, 19 Drawing Sheets

(58) Field of Classification Search
CPC .......... H02B 1/052; H02B 1/21; H02B 1/205; H05K 7/1457; H05K 7/1489; H05K 7/1492
See application file for complete search history.

(56) References Cited

U.S. PATENT DOCUMENTS 3,711,748 A * 1/1973 Dietz .................... H02B 1/056 361/825
3,855,504 A 12/1974 Olashaw
4,251,851 A * 2/1981 Diersing ................ H02B 1/056 361/652
4,446,503 A 5/1984 Link et al.
4,945,450 A * 7/1990 Sabatella ............... H02B 1/056 361/624
5,343,356 A * 8/1994 Hancock .................. H02B 1/26 174/68.2
5,450,282 A * 9/1995 Webber .................. H02B 1/056 361/637
5,628,534 A * 5/1997 Morgan ................... H02B 1/38 292/101
5,784,250 A * 7/1998 Rose ...................... H02B 1/056 361/627
5,805,414 A * 9/1998 Feldhaeusser ....... H01R 9/2483 174/68.2
5,835,341 A * 11/1998 Rhodes .................. H02B 1/056 439/213
7,449,645 B1 * 11/2008 Flegel ...................... H01R 4/64 439/723
7,692,112 B2 * 4/2010 Deboer .................. H01H 89/06 200/400
8,929,055 B2 * 1/2015 Potratz .................. H02B 1/056 174/68.2
9,859,692 B1 * 1/2018 Lalancette ............... H02B 1/06
10,411,440 B1 * 9/2019 Robinson ................. H02B 1/06
10,951,027 B2 * 3/2021 Thornton ............... H02B 1/056
11,217,980 B1 * 1/2022 Mitteltstadt ............ H02B 1/205
11,777,292 B2 * 10/2023 Yuventi .................. H02B 1/202 361/825
12,300,977 B2 * 5/2025 Kulkarni ............ H02B 13/0358
2007/0035914 A1 2/2007 Birner
2008/0158786 A1 * 7/2008 Letourneau ............ H02B 1/056 361/637
2011/0002089 A1 * 1/2011 Sharp ..................... H02B 1/056 361/673
2011/0310534 A1 * 12/2011 Cosley ..................... H02B 1/32 29/854
2012/0152705 A1 6/2012 Osawa et al.
2012/0200986 A1 8/2012 Maloney et al.
2016/0233649 A1 * 8/2016 Baillargeon ......... H01R 25/162
2017/0018910 A1 1/2017 Mittelstadt
2017/0063051 A1 * 3/2017 Sharp ....................... H02B 1/14
2017/0358416 A1 12/2017 Lindh et al.
2018/0246150 A1 8/2018 Cook
2019/0081474 A1 * 3/2019 Colbaugh .............. H02H 9/042
2019/0140429 A1 5/2019 Mascarenhas et al.
2019/0140439 A1 5/2019 Mascarenhas et al.
2020/0112199 A1 4/2020 Rao
2020/0259336 A1 8/2020 Rao et al.
2020/0395739 A1 * 12/2020 Santore ................ H02H 1/0007
2021/0083506 A1 3/2021 Rao et al.
2021/0159690 A1 5/2021 Sorenson et al.
2022/0021195 A1 1/2022 Rathi et al.
2022/0172913 A1 6/2022 Rao et al.
2022/0216697 A1 7/2022 Rao et al.
2022/0216728 A1 7/2022 Ashman et al.
2022/0224084 A1 7/2022 Candelora et al.
2023/0120453 A1 4/2023 Rao et al.
2023/0120740 A1 4/2023 Lewchuk et al.
2023/0179015 A1 6/2023 Rao et al.
2023/0283051 A1 * 9/2023 Bhattar .................... H02B 1/14 361/627
2023/0396069 A1 12/2023 Rao et al.
2024/0222040 A1 7/2024 Reid et al.
2024/0266823 A1 8/2024 Pahl et al.
2025/0038517 A1 1/2025 Rao
2025/0087974 A1 3/2025 Weinstein et al.
2025/0266711 A1 8/2025 Ashman et al.

OTHER PUBLICATIONS

PCT International Search Report and Written Opinion, PCT Application No. PCT/US2024/046929, Jan. 14, 2025, five pages.
PCT Invitation to Pay Additional Fees, PCT Application No. PCT/US2024/046929, Oct. 30, 2024, two pages.
United States Office Action, U.S. Appl. No. 18/886,812, filed Apr. 1, 2026, 22 pages.
Non-Final Rejection Mailed on Jun. 17, 2026 for U.S. Appl. No. 18/639,819, 16 page(s).

* cited by examiner

Electrical Panel
100

Enclosure
175

Electrical Panel
100

Electrical Panel
100

Electrical Panel
100

MODULAR ELECTRICAL PANELBOARD

CROSS-REFERENCE TO RELATED APPLICATION(S)

This application claims the benefit of and priority to U.S. Provisional Patent Application Ser. No. 63/583,141, "Electrical Panel Construction," filed on Sep. 15, 2023 and U.S. Provisional Patent Application Ser. No. 63/551,192, "Electrical Panel Construction," filed on Feb. 8, 2024, each of which incorporated herein by reference in its entirety.

BACKGROUND

1. Technical Field

This disclosure relates generally to modular chassis (e.g., modular electrical panels) and chassis modules (e.g., electrical components) for the modular chassis.

2. Description of Related Art

Continued electrification will add massive amounts of demand to electrical distribution. Estimates are that net distribution capacity in the U.S. will increase by two to three times to support fully renewable energy sources. The current distribution system and site-level (e.g., building) wiring are not well instrumented and not easily controllable. They are not well suited to implement sophisticated energy management.

Furthermore, many electrical panels for buildings (e.g., residential homes) are bulky, costly, and difficult to install, repair, replace, and upgrade.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

INTRODUCTION

As previously mentioned, conventional electrical panels on buildings (e.g., residential homes) are bulky, costly, and difficult to install, repair, replace, and upgrade. The present disclosure overcomes these limitations by describing modular electrical panels with modular electrical components (also referred to as "electrical modules," "chassis modules," "modules," or "electrical panel components"). These provide many advantages to installers and building owners: (1) the modular electrical panel can be rightsized for the usage needs of each building. For example, if a building will only use 16 branch circuits, the panel can be installed with just 16 branch circuits (e.g., instead of a larger number of circuits on a conventional preset panel), thus saving the building owner money. Additionally, an installer no longer needs to guess which components will be needed for a given building before arriving at the installation site. (2) The modular electrical components can be installed on many different types of electrical panels (e.g., used in different application settings). (3) The modular electrical components can be mass produced (since the same set of modules can be installed on many different types of electrical panels). (4) Individual modular electrical components are easily accessible and can be easily replaced on site without an installer removing large portions of the panel (e.g., without removing adjacent modules). (5) Modular electrical components on an electrical panel can be individually upgraded (e.g., with additional functionalities) without the replacing or upgrading the entire electrical panel (or large portions of the panel). Example modular electrical panels and modular electrical components that provide one or more of the above advantages are further described below.

Example Modular Electrical Panels

Figure 1A:
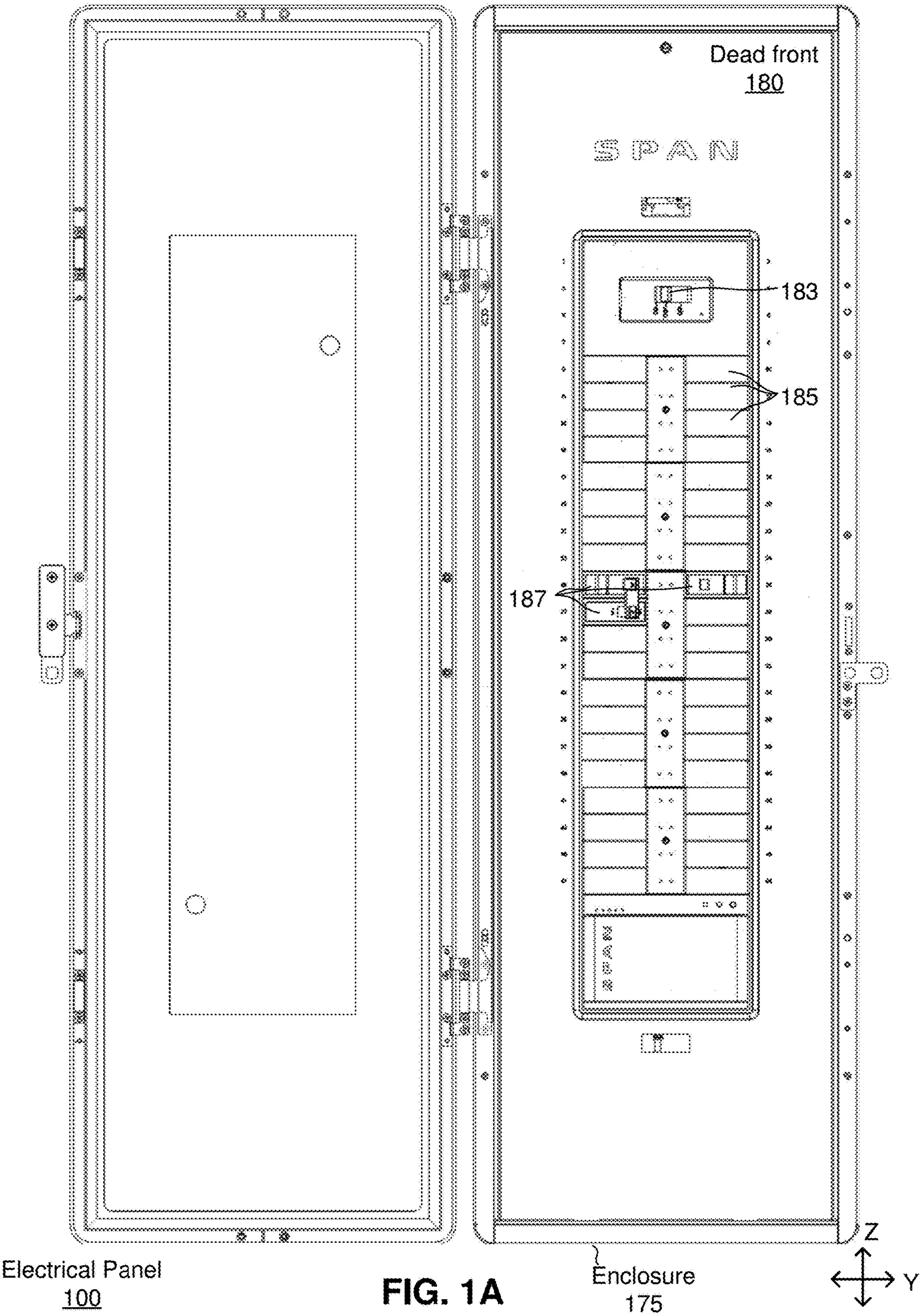
FIGS. 1A-1C are diagrams illustrating front views of an example modular electrical panel.
Figure 1B:
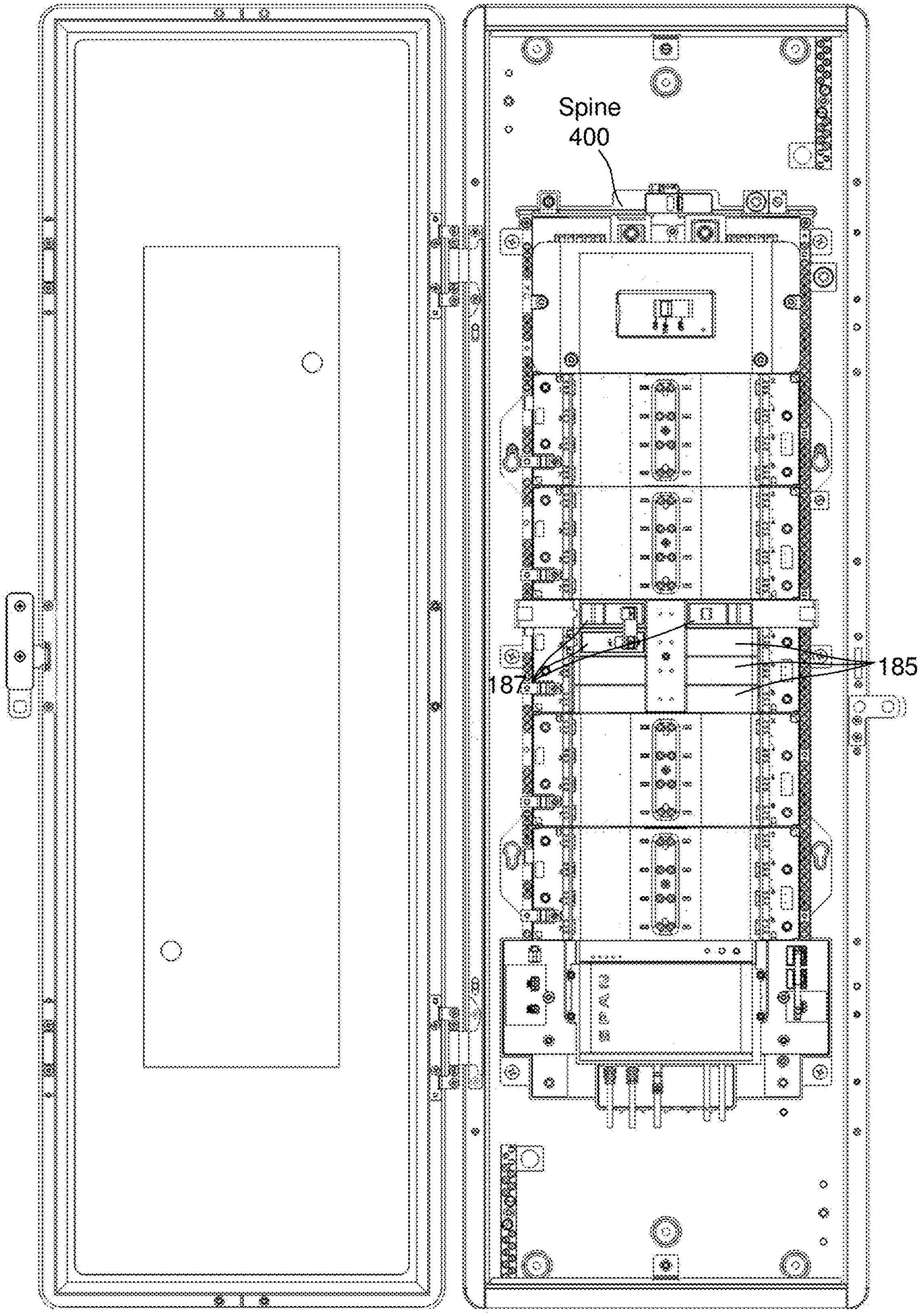
Figure 1C:
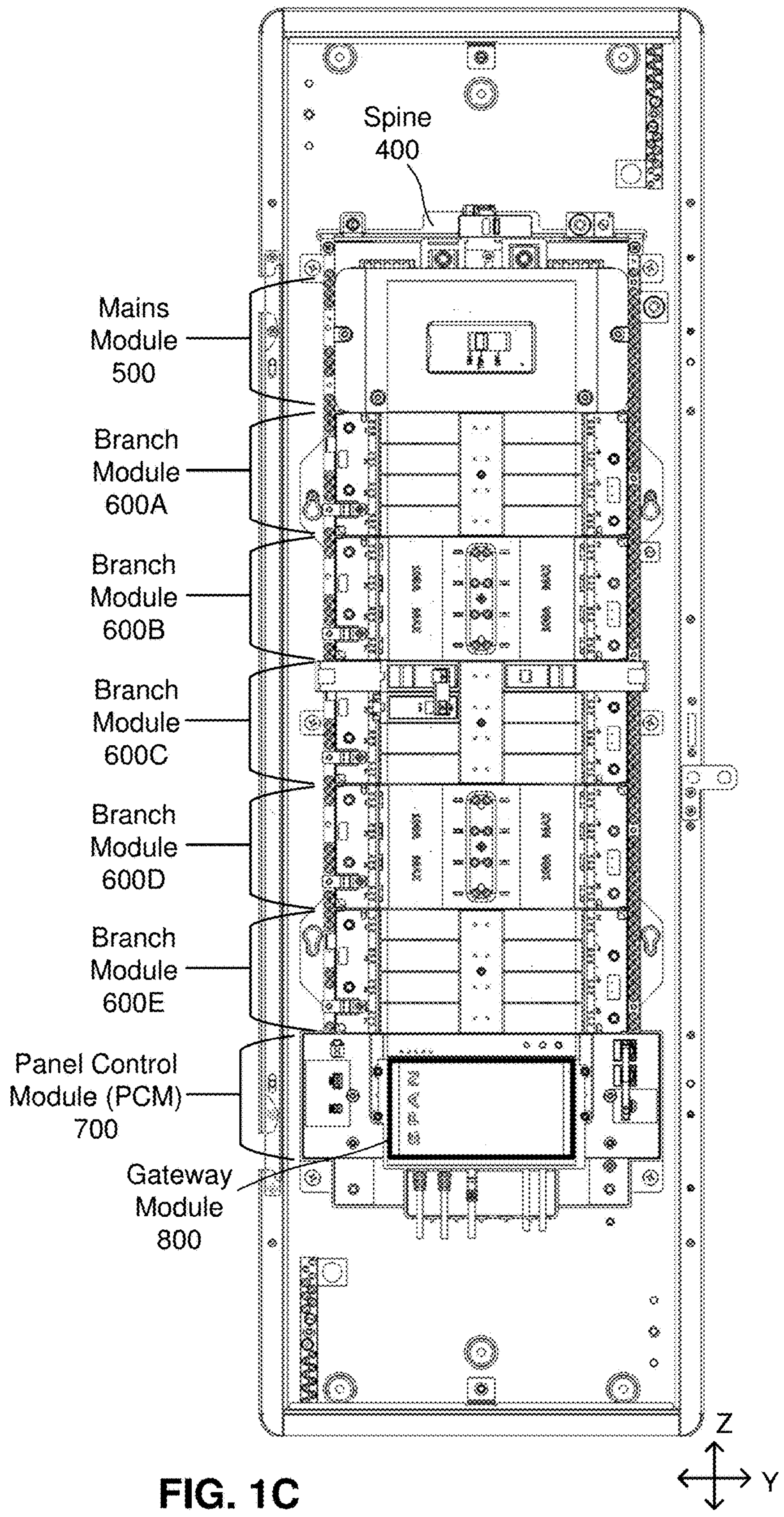

FIGS. 1A-1C are diagrams illustrating front views of a physical embodiment of a modular electrical panel 100. FIG. 1A is an end user's view of the panel 100. In the end user view, most of the electrical components are not physically accessible because they are hidden in an enclosure 175, under a dead front panel 180, and under modular dead front panels 185 (although the main breaker switch 183 and switches for three overcurrent circuit breakers 187 are accessible). FIG. 1B is a view of the electrical panel 100 with the dead front panel 180 removed and many of the modular dead front panels 185 removed. FIG. 1B illustrates various electrical component modules installed in a spine 400. FIG. 1C is a similar to FIG. 1B, except the door of the enclosure 175 is removed and labels are added to the electrical modules. Specifically, in the example of FIG. 1C, the panel 100 includes (from top to bottom) a mains module 500, five branch modules (labeled 600A-E), a panel control module (PCM) 700, and a gateway module 800.

Figure 2:
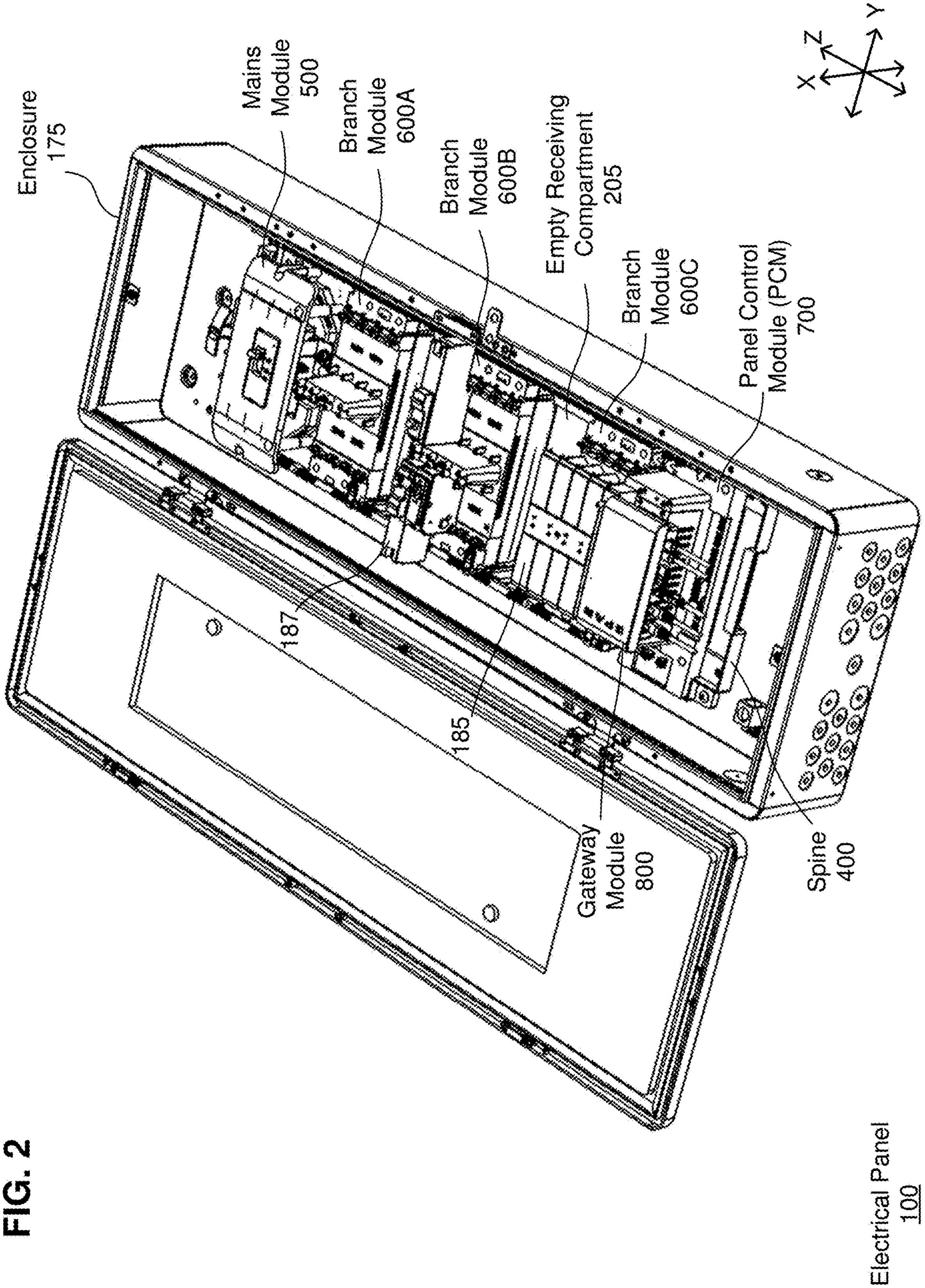
FIG. 2 is a perspective diagram of the electrical panel with a different arrangement of electrical modules.
Figure 3:
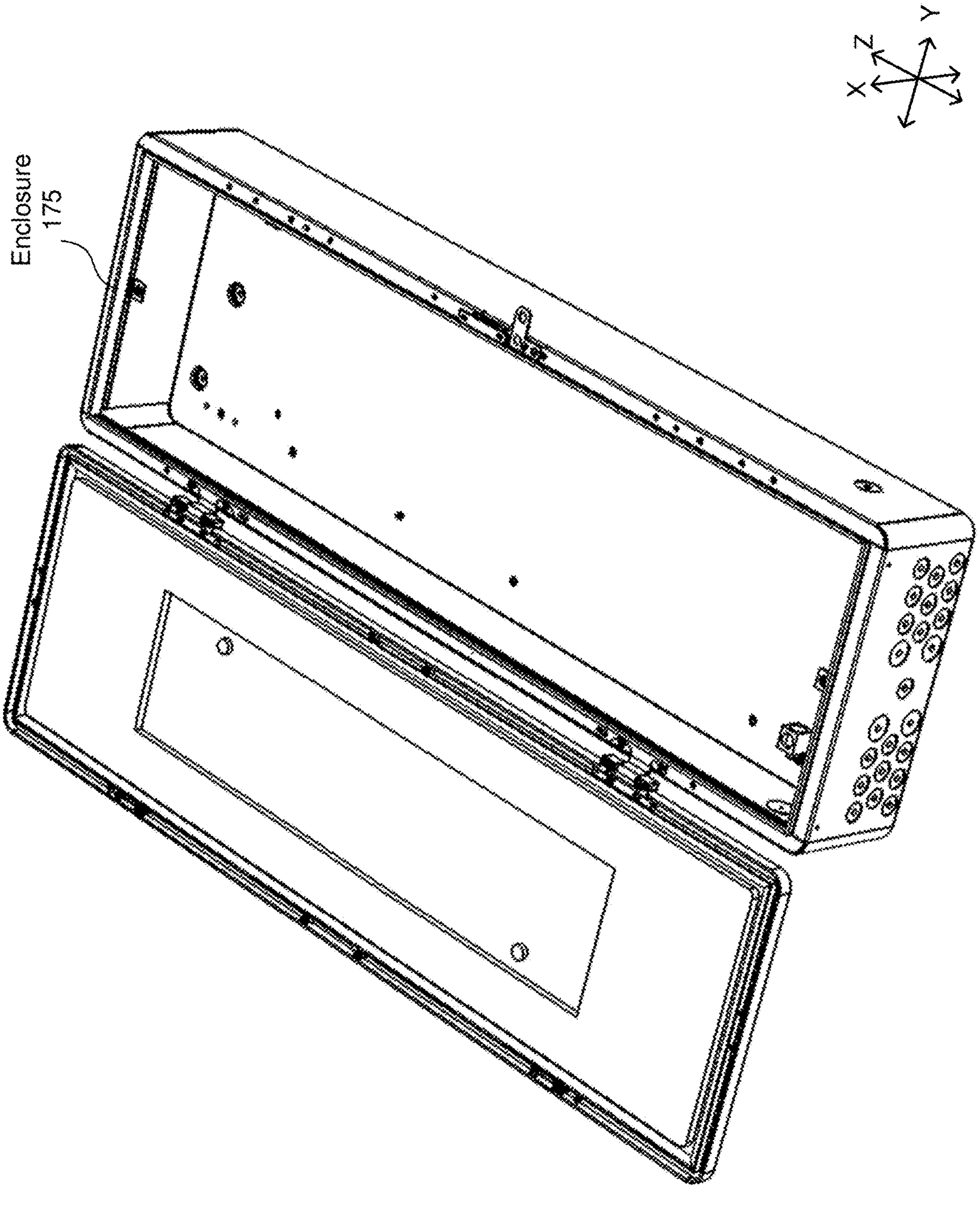
FIG. 3 is a perspective diagram of an example enclosure of the electrical panel.

FIG. 2 is a perspective diagram of the electrical panel 100 with a different arrangement of electrical modules. Specifically, in the example of FIG. 2, the panel 100 includes (from top to bottom) a mains module 500, branch modules 600A-B, an empty module receiving compartment 205, a branch module 600C, a PCM 700, and a gateway module 800. FIG. 3 is a perspective diagram of the enclosure 175 isolated from the spine and electrical modules.

Although the descriptions herein are generally in the context of electrical panel 100, the descriptions herein are generally applicable to chassis that can receive modules and, more specifically, applicable to other types of electrical panels (e.g., the size of the panel and the number of modules may be different) which accommodate different electrical needs for different buildings. In a first example, a smaller panel includes three receiving compartments: a top receiving compartment with a mains module 500, a middle receiving compartment with a branch module 600, and a bottom receiving compartment with a PCM module 700. In a second example, a panel includes a top receiving compartment with a lug module (described with respect to FIG. 9), three middle receiving compartments with branch modules 600, and a bottom receiving compartment with a PCM module 700.

The spine 400 and the various electrical modules are further described below.

Example Spines

Figure 4:
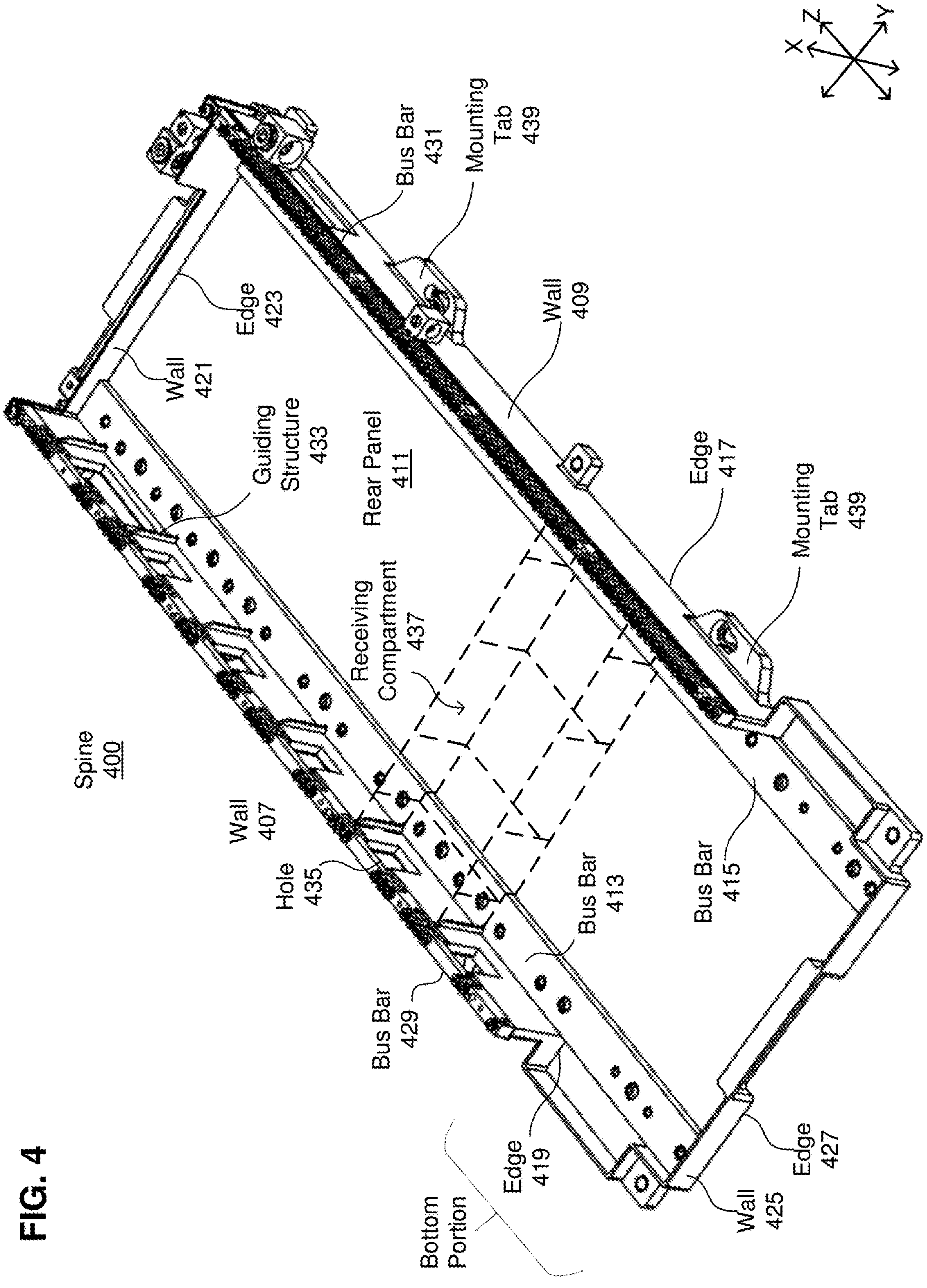
FIG. 4 is a perspective diagram of an example spine of the electrical panel.

FIG. 4 is a perspective diagram of the spine 400 of the electrical panel 100. The spine 400 may be installed into the enclosure 175 via mounting tabs 439. The mounting tabs 439 include keyhole features that can receive a fastener. The mounting tabs 439 allow the spine 400 to easily be placed into and removed from the enclosure 175. Among other advantages, the spine 400 can be installed upside down (e.g., rotated 180 degrees about the x-axis in FIG. 4). This enables the spin 400 to be installed so that the feeder terminals (not labeled in FIG. 4) face the feeder wires regardless of whether the feeder wires are at the top or bottom (along the z-axis) of the enclosure.

In some embodiments, the spine 400 with modules installed in receiving compartments weighs a total of fifty pounds or less so that a single person (instead of two or more people) can install the spine 400 and the modules into the enclosure 175, thus reducing installation costs.

Among other advantages, the spine 400 includes receiving compartments (e.g., 437) that can receive different modular electrical components. Receiving compartments may also be referred to herein as "slots," or "module slots,"). The receiving compartments (e.g., 437) enable different types of electrical modules to be installed on the electrical panel 100 (e.g., a branch module or a mains module) to accommodate the needs of the building. Said differently, an electrical module in a receiving compartment (e.g., a mains module) may be removed and replaced by an electrical module of a different type (e.g., a branch module). The receiving compartments are formed from the walls of the spine; bus bars 413, 415; and guiding structures (e.g., 433) as further described below. Note that the spine 400 can include additional of fewer receiving compartments than as illustrated in FIG. 4.

The spine 400 includes a rear panel 411 and walls 407, 421, 409, 425 that are raised (in the +x direction) from edges 419, 423, 417, 427 of the rear panel 411 and that extend along their respective edges. For example, wall 407 is raised from edge 419 and extends along edge 419. Similarly, wall 409 is raised from edge 417 (forming an opposite side of the spine 400).

Although many receiving compartments of spine 400 are the same size (or substantially the same size (e.g., the dimensions are within 10%)), a spine may include different sized receiving compartments to accommodate different sized modules. For example, along the z-axis a spine can include any combination of 1.5 inch, 2 inch, 4 inch, and 8 inch receiving compartments. Furthermore, in the example of FIG. 4, the width of the spine 400 (along the y-axis) increases at a bottom portion. This creates a wider receiving compartment (relative to the other receiving compartments), thus enabling the spine 400 to receive a wider electrical panel component (e.g., the PCM module 700), which may otherwise not fit into other receiving compartments (e.g., 437). Among other advantages, this wider receiving compartment further increases the customizability of the electrical panel 100.

The spine 400 includes two rectangular bus bars 413, 415 in the cavity formed from the walls (in other words, the bus bars 413, 415 are between the walls of the spine 400). The bus bars 413, 415 are the L1 and L2 bus bars. The bus bars 413, 415 are coupled (e.g., secured or fixed) to the rear panel 411 (e.g., via heat staking, snap-features, or fasteners). The bus bars 413, 415 are in corners formed by the rear panel 411 and the walls 407, 421, 409, 425 (however this isn't required). Along the y-axis, the bus bars 413, 415 are spaced apart from each other and on opposite sides of the spine 400. Along the z-axis, the bus bars 413, 415 extend along the length of the spine 400. More specifically, each bus bar extends from wall 421 to wall 425 (however the bus bars are not required to extend the entire length of the spine 400). Thus, in the example of FIG. 4, the bus bars 413, 415 are on opposite sides of receiving compartment 437 (along the y-axis). The presence of both bus bars 413, 415 in a receiving compartment enables an electrical panel component (in the receiving compartment) to electrically couple to both bus bars 413, 415. Notably, the bus bars in the example of FIG. 4 do not include stabs.

The spine 400 includes rectangular bus bars 429, 431 coupled to top surfaces of walls 407 and 409 (e.g., via heat staking, snap-features, or fasteners). One of the bus bars (e.g., 429) may be a neutral bus bar and the other (e.g., 431) may be a ground bus bar.

The spine 400 includes multiple guiding structures (e.g., 433). Guiding structures may also be referred to herein as "mounting structures" or "module guides." The guiding structures engage with modular electrical components when they are placed into receiving compartments of the spine and prevent modular electrical panel components in the receiving compartments from sliding into adjacent receiving compartments (e.g., prior to the modules being fixed to the bus bars). More specifically, the guiding structures engage with track indentations (e.g., on outer surfaces) of the of the modular electrical panel components as further described below.

The guiding structures may be fins or tabs that extend from inner surfaces of walls 407 and 409. To give a specific example, the guiding structure 433 is raised from an inner surface of wall 407 and extends toward the inner surface of wall 409, which is opposite wall 407 (in this context, "inner" is relative to the cavity of the spine 400). Each receiving compartment includes a set of one or more (e.g., four) guiding structures (e.g., in corners of the receiving compartments). In the example of FIG. 4, the guiding structures on wall 407 are aligned (along the z-axis) with guiding structures on wall 409 (not illustrated in FIG. 4).

Installing an electrical module may include placing (e.g., sliding) the module in a receiving compartment and securing the module into the receiving compartment (e.g., so the component remains fixed to and electrically coupled to both bus bars). A module may be secured to the spine 400 via bolts or screws with fasteners (which may improve heat rejection). Thus, in the example of FIG. 4, the bus bars 413, 415 include a set of holes (to receive bolts or screws) for each of the receiving compartments so the modules can be directly secured to the bus bars 413, 415. The holes may have a standard and repeating hole pattern corresponding to the receiving compartment positions so that different modules can be secured to the bus bars regardless of which receiving compartment they are placed into. In some embodiments, spring loaded clips are used in addition to or alternative to bolts (or screws).

In some embodiments, the modules in the receiving compartments may be independently powered and communicate with one another. In order to achieve this, a wired connection may be installed between modules to provide DC voltage and signals (e.g., over a CAN bus interface or the like) (the connection may carry 3.3V or 5V). Thus, one or more of the side walls (407 and 409) may include one or more holes (or "cavities") (e.g., 435) aligned with the receiving compartments (e.g., 435) for wires of these connections (e.g., each receiving compartment may include at least one corresponding hole in a side wall). Among other advantages, these side wall holes (e.g., 435) ease installation of the wired connections.

Although the above descriptions with respect to FIG. 4 describe many features, a spine is not required to include all of these features. For example, some spine embodiments may not include: all four walls 407, 409, 421, 425, guiding structures 433, mounting tabs 439, holes one or both of the bus bars 413, 415 (for mounting the modules), or some combination thereof. Furthermore, features of a spine are not required to have the same shape as the features illustrated in FIG. 4.

Example Mains Modules

Figure 5A:
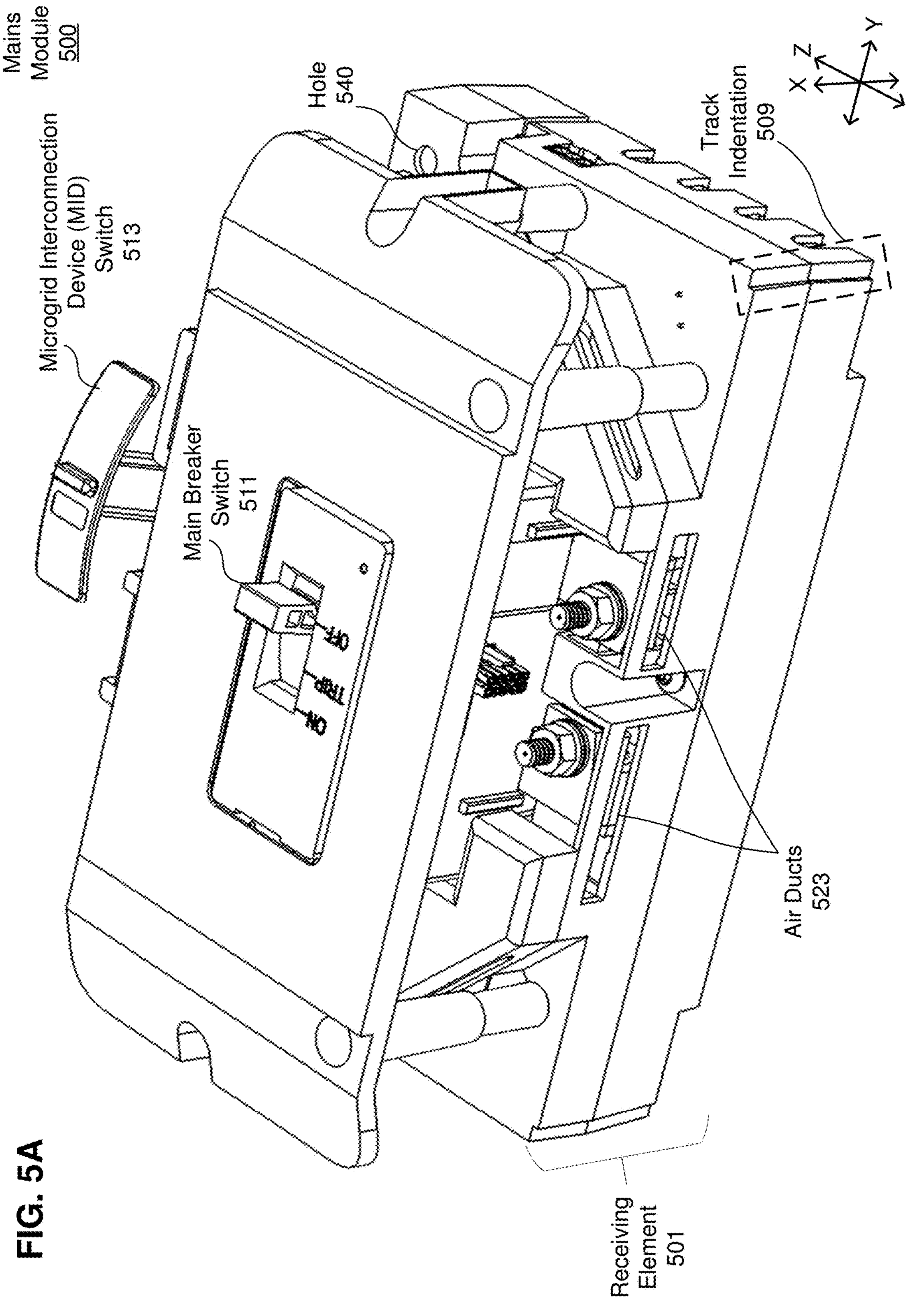
FIGS. 5A-B are diagrams of an example mains module.
Figure 5B:
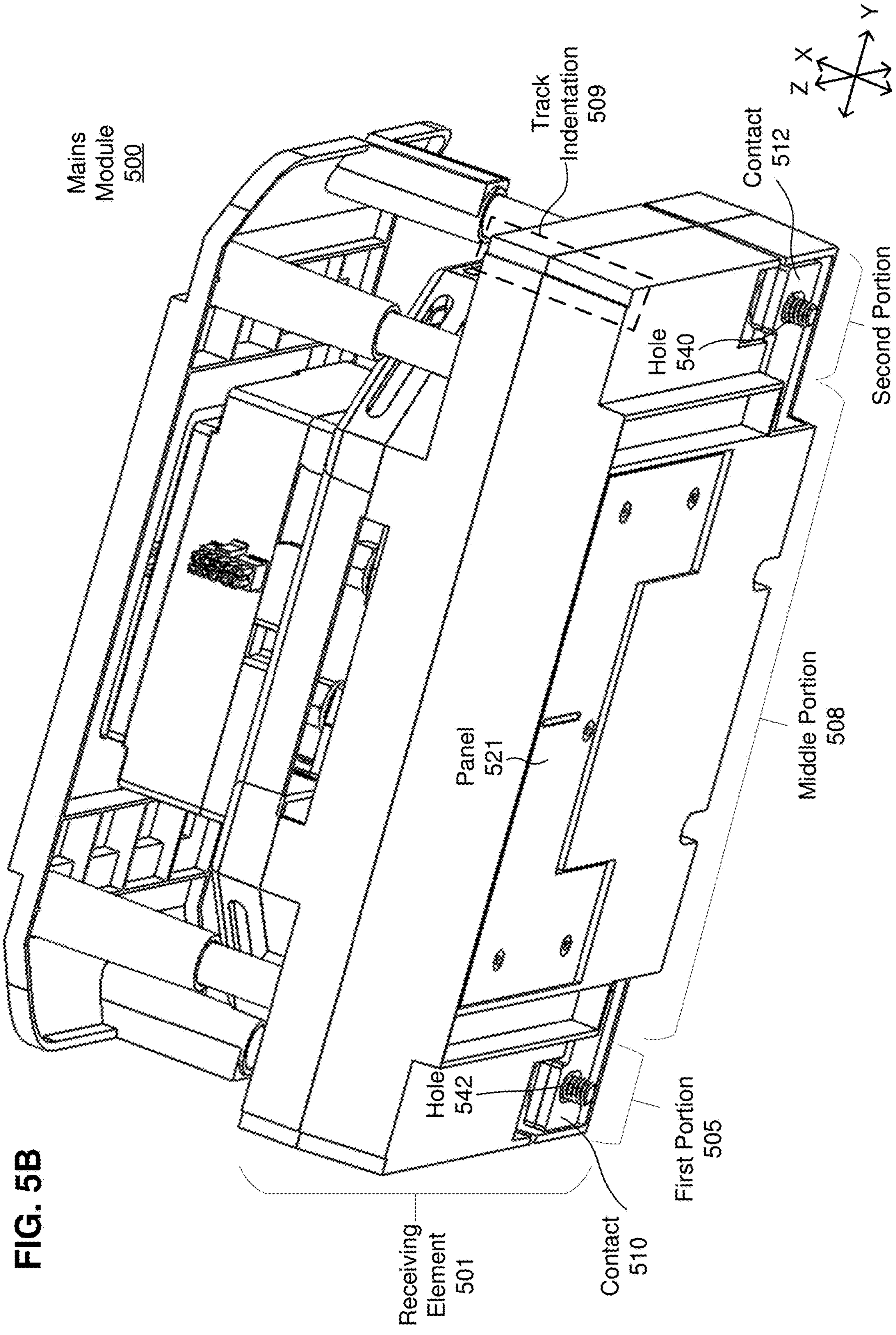

In some embodiments, the electrical panel 100 includes a mains module 500. The mains module 500 is a modular electrical panel component that may be installed into one (e.g., of many) of the receiving compartments of the spine 400 (however, practically the mains module 500 may be installed into one of the top receiving compartments of the spine to couple to the feeder wires). FIGS. 5A-B ("FIG. 5" collectively) are diagrams of an example mains module 500. Specifically, FIG. 5A is a perspective diagram of an example mains module 500 illustrating the front side of the module 500. FIG. 5B is a perspective diagram of the mains module 500 illustrating the back side of the module 500 (that engages with the spine 400).

The mains module 500 may include the main breaker of the panel 100, a MID (Microgrid Interconnection Device), or some combination thereof (e.g., no main breaker and no MID). In the example of FIG. 5, the mains module includes a main breaker and a MID (e.g., see switches 511 and 513 in FIG. 5A). The mains module 500 may provide a location to connect the main feeders to the panel 100 (and thus provide power to the bus bars 413, 415), provide overcurrent protection, and/or a disconnect. The mains module 500 may be rated up to 200 amps. If the mains module 500 includes an MID, the MID allows the panel 100 to isolate itself from the grid.

The mains module 500 includes a receiving element 501 (also referred to as an "insertion element"). The receiving element 501 is a container or cartridge shaped to slide into a receiving compartment of the spine 400 (e.g., one of many receiving compartments) and be fixed to the bus bars in the receiving compartment. The receiving element 501 includes a first portion 505 on a first side of the receiving element 501, a second portion 507 on a second side of the receiving element 501 (e.g., an opposite side (along the y-axis)), and a middle portion 508 between the first and second portions. The first portion 505 receives and directly couples to a first bus bar (e.g., 415). Similarly, the second portion 507 receives and directly couples to a second bus bar (e.g., 413). Since the bus bars 413, 415 may pass through the receiving compartments, the first and second portions may extend along the length of the mains module 500 (along the z-axis) to accommodate each bus bar.

The first portion 505 includes a metal electrical contact (also "bus bar contact") 510 and the second portion 507 include an electrical contact 512. Both contacts 510, 512 physically contact a bus bar of the spine 400 (when the module 500 is in a receiving compartment).

As previously described, a module (e.g., the mains module 500) may be secured to (bus bars of) the spine 400 via bolts or screws. Thus, the receiving element 501 (e.g., the first and second portions) may include a set of holes to receive bolts or screws. For example, see holes 540, 542 in FIGS. 5A and 5B. The holes may have a (e.g., standard) pattern or arrangement on the receiving element 501 that matches the hole pattern of the bus bars.

The receiving element 501 includes a middle portion 508 between the first and second portions 505, 507. In the example of FIGS. 5A and 5B, the middle portion 508 extends along the −x direction farther than the first and second portions 505, 507. Thus, the middle portion 508 engages with a gap between the bus bars 413, 415 when the receiving element 501 is in a receiving compartment. In the example of FIG. 5B, the middle portion 508 includes an (e.g., aluminum) panel 521 to increase heat dissipation during operation of the panel 100. The middle portion 508 also includes air ducts 523. The air ducts 523 allow air to pass through internal components of the mains module 500 to further improve heat management. Other modules may include similar air ducts so that, when installed on a panel, the air ducts of each module align with each other to create a long airflow passage along the panel 100. A fan module 749 in the PCM 700 may create an air current through the module air ducts (the fan module is further described with respect to FIG. 7C).

The receiving element 501 also includes track indentations (e.g., 509) that extends along the sliding direction of the receiving compartment (which is along the x-axis in the figures). Track indentations may also be referred to as "guide slots." As illustrated, the track indentation 509 is on an external surface of the receiving element 501 (however, this is not required). The track indentation 509 is configured to engage with a guiding structure (e.g., 433) of the spine 400 to (a) guide placement of the mains module 500 into the modular spot and retain the mains module 500 in the receiving compartment after placement. Thus, the receiving element 501 may include one or more track indentations (e.g., four) aligned with an arrangement of one or more guiding structures in a receiving compartment. In the example of the mains module 500, the receiving element 501 includes track indentations at corners of the receiving element 501.

Although not illustrated in FIG. 5, the receiving element 501 may include a port for a wired connection. The port is on a side parallel to the xz plane. When the receiving element 501 is in a receiving compartment of the spine 400, the port is on a side of the receiving element 501 facing wall 407 and aligned with a hole (e.g., 435), which allows an installer to connect the wire to the port to establish the connection. As previously described, the wired connection may provide DC voltage and signals (e.g., over a CAN bus interface or the like) to and/or from the module 500.

Example Branch modules

Figure 6A:
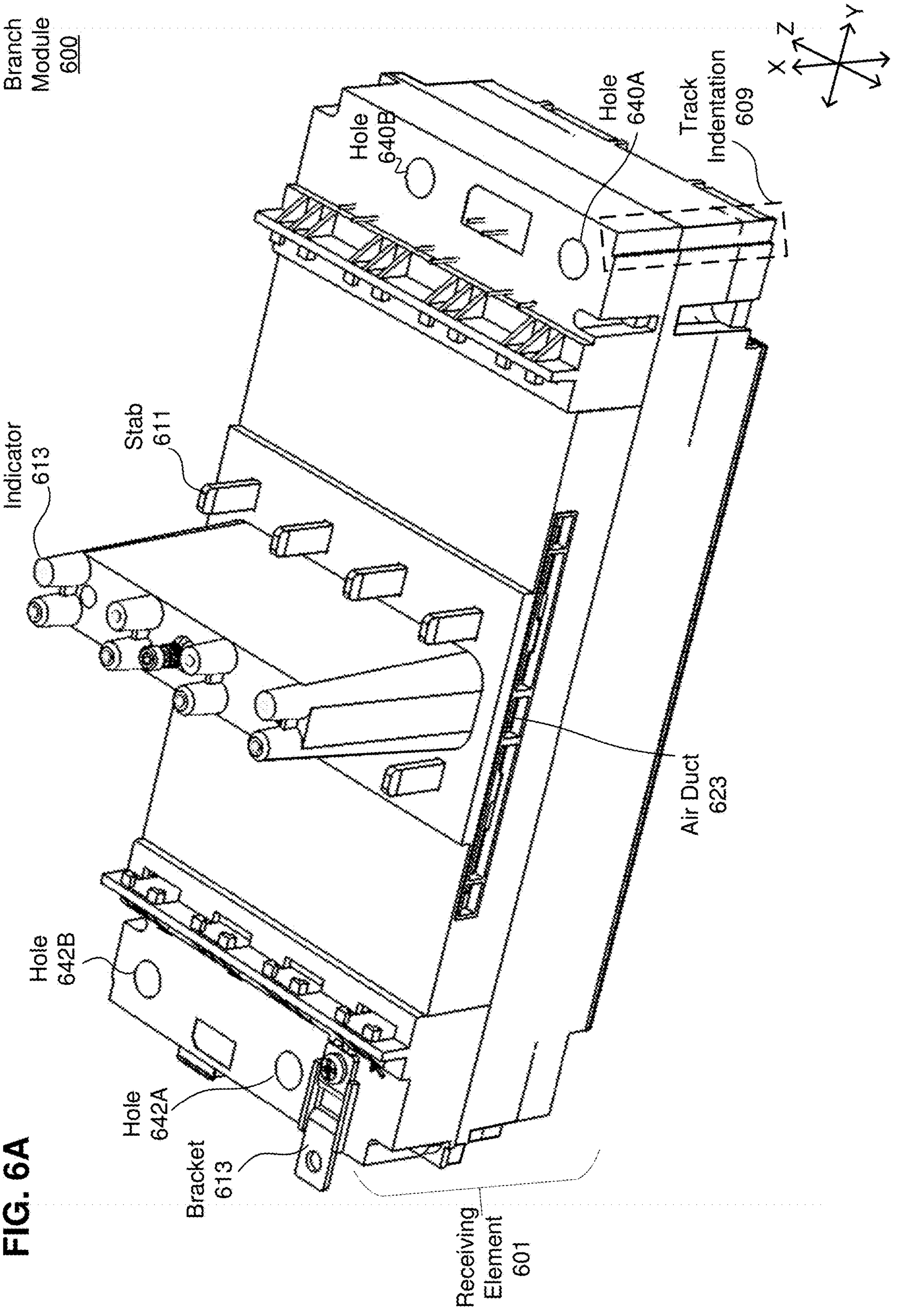
FIGS. 6A-C are diagrams of an example branch module.
Figure 6B:
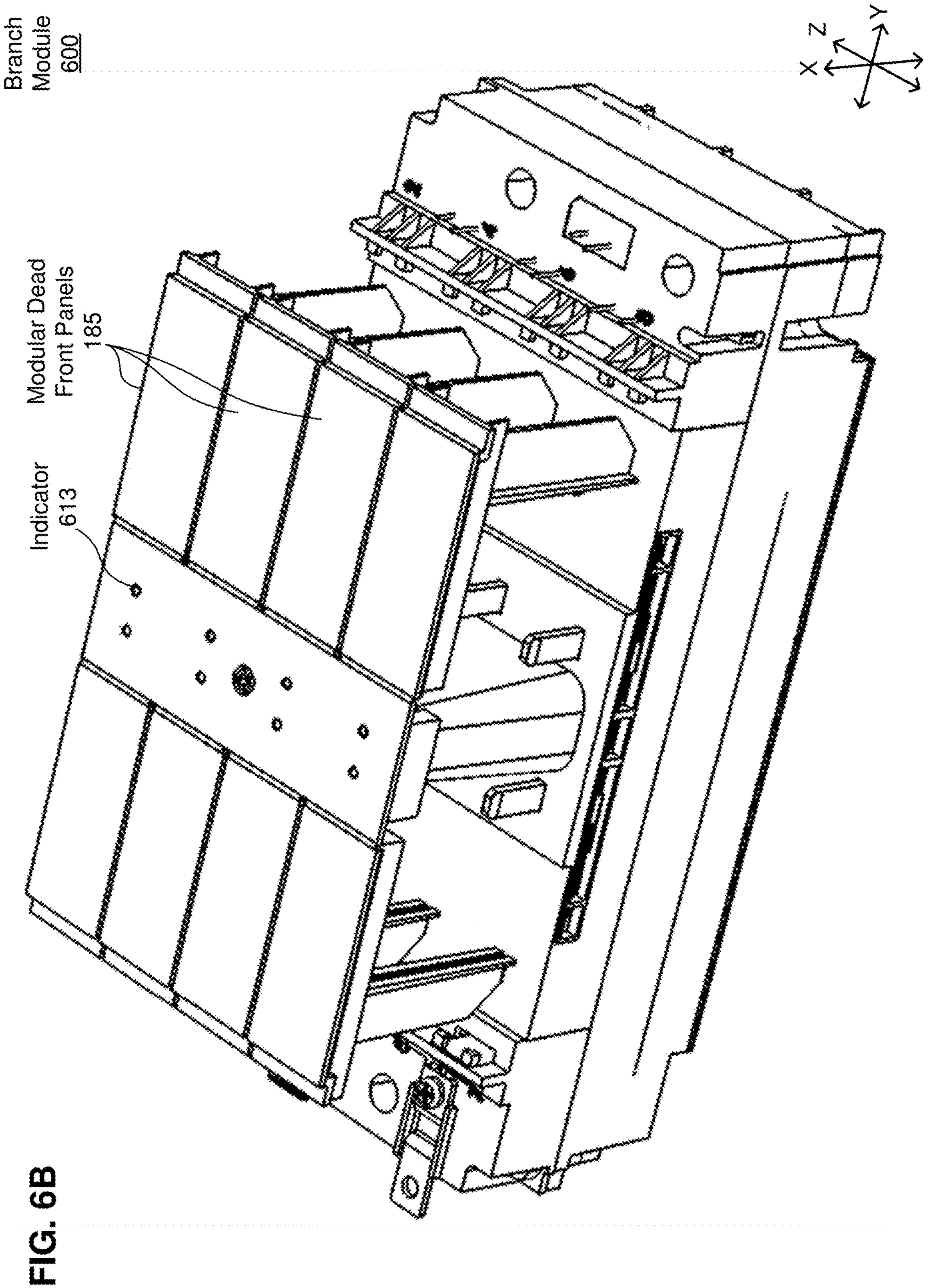
Figure 6C:
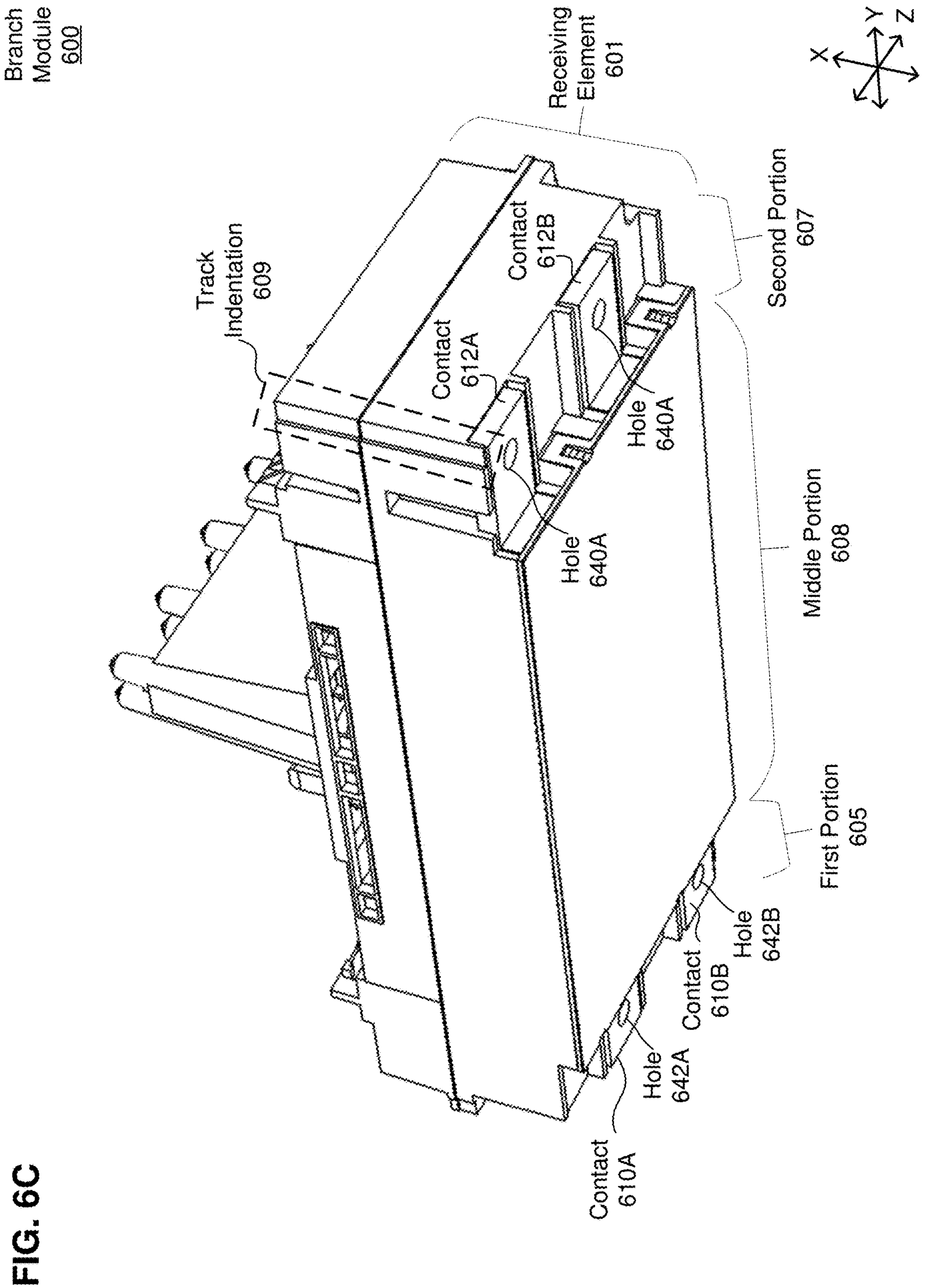

In some embodiments, the electrical panel 100 includes a branch module 600. The branch module 600 is a modular electrical panel component that may be installed into one (e.g., of many) of the receiving compartments of the spine 400. Since a building (e.g., a residential building) may include many circuits, a panel may include multiple branch modules 600 to accommodate the expected electrical needs of the building. FIGS. 6A-C ("FIG. 6" collectively) are diagrams of an example branch module 600. Specifically, FIG. 6A is a perspective diagram of the branch module 600 illustrating the front side of the module. FIG. 6B is similar to FIG. 6A, except the branch module 600 additionally includes modular dead front panels 185. FIG. 6C is a perspective diagram of the branch module 600 illustrating the back side of the module (that engages with the spine 400).

Similar to the receiving element 501 of the mains module 500, the receiving element 601 of the branch module 600 includes a first portion 605, a middle portion 608, a second portion 607, track indentations (e.g., 609), a port for a wired connection (not illustrated), and an air duct 623 with similar mechanical configurations and functionalities. Due to this, descriptions of these components are omitted for brevity. The receiving element 609 also includes electrical contacts 610, 612 and holes 642, 640 at the first and second portions 605, 607 (similar to the receiving element 501), however, unlike the receiving element 501, the receiving element 609 includes two electrical contacts 610A, 610B and two holes 642A, 642B at the first portion 605 and includes two electrical contacts 612A, 612B and two holes 640A, 640B at the second portion 607 (for a total of four electrical contacts that contact bus bars of the spine 400 and a total of four holes to receive bolts or screws that secure the contacts to the bus bars). Similar to the receiving element 501, the holes of the receiving element 601 may have a (e.g., standard) pattern or arrangement on the receiving element 601 that matches the hole pattern of the bus bars.

The example branch module 600 includes eight switched circuit branches (however additional or fewer circuits are possible for a branch module). Each circuit branch includes a stab (e.g., stab 611) which can engage with an overcurrent circuit breaker installed on the branch module 600. In some embodiments, the branch module 600 is rated up to 200 amps. The branch module 600 may include additional branch circuit functionalities, such as current or voltage sensing, AFCI protection, light (e.g., LED) indication, or some combination thereof for each circuit branch.

The modular dead front panels 185 provide touch-safe interfaces to homeowners. Additionally, the panels 185 can be individually removed (e.g., snapped off) from each other and from the branch module 600 to accommodate additional overcurrent circuit breakers as the breakers are installed on the module 600.

The branch module 600 includes a bracket 613 protruding from a top surface to contact a neutral bus bar (e.g., 429) of the spine (e.g., to enable current or voltage metering). The bracket 613 may be bolted to the neutral bus bar.

The branch module 600 includes an indicator (e.g., indicator 613) for each of the switched circuit branches. Each indicator includes a light source (e.g., an LED) in the branch module 600 and a light pipe that directs light from the source to the external environment. Each indicator may illuminate light indicating the state of a relay in the associated circuit branch (e.g., a green light indicates the relay is closed). As illustrated in FIG. 6B, the indicators can be seen through the dead front. Thus, the indicators may allow a user to easily and quickly determine the states of each relay of each branch module.

Example PCMs (Panel Control Modules)

Figure 7A:
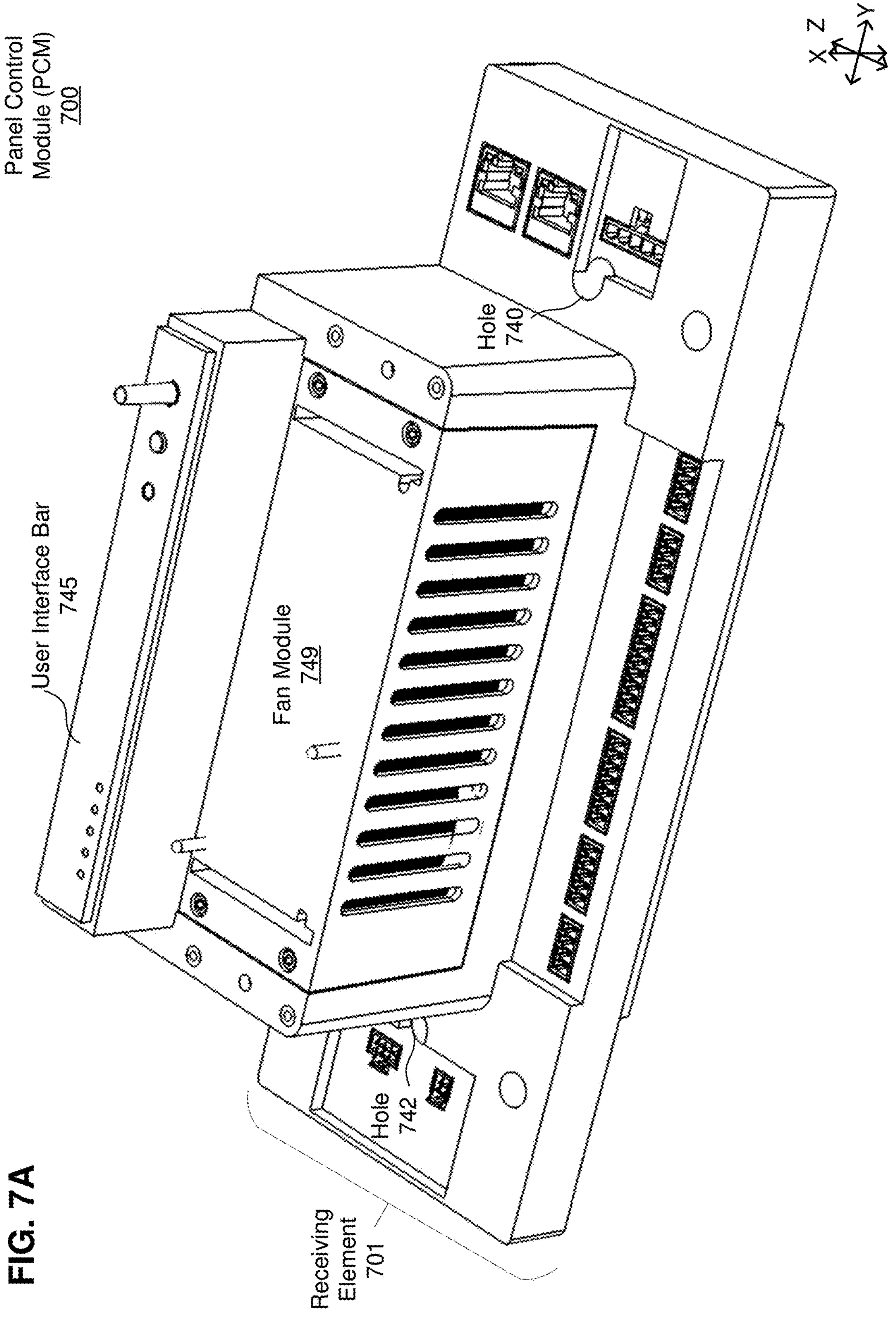
FIGS. 7A-B are diagrams of an example PCM (panel control module).
Figure 7B:
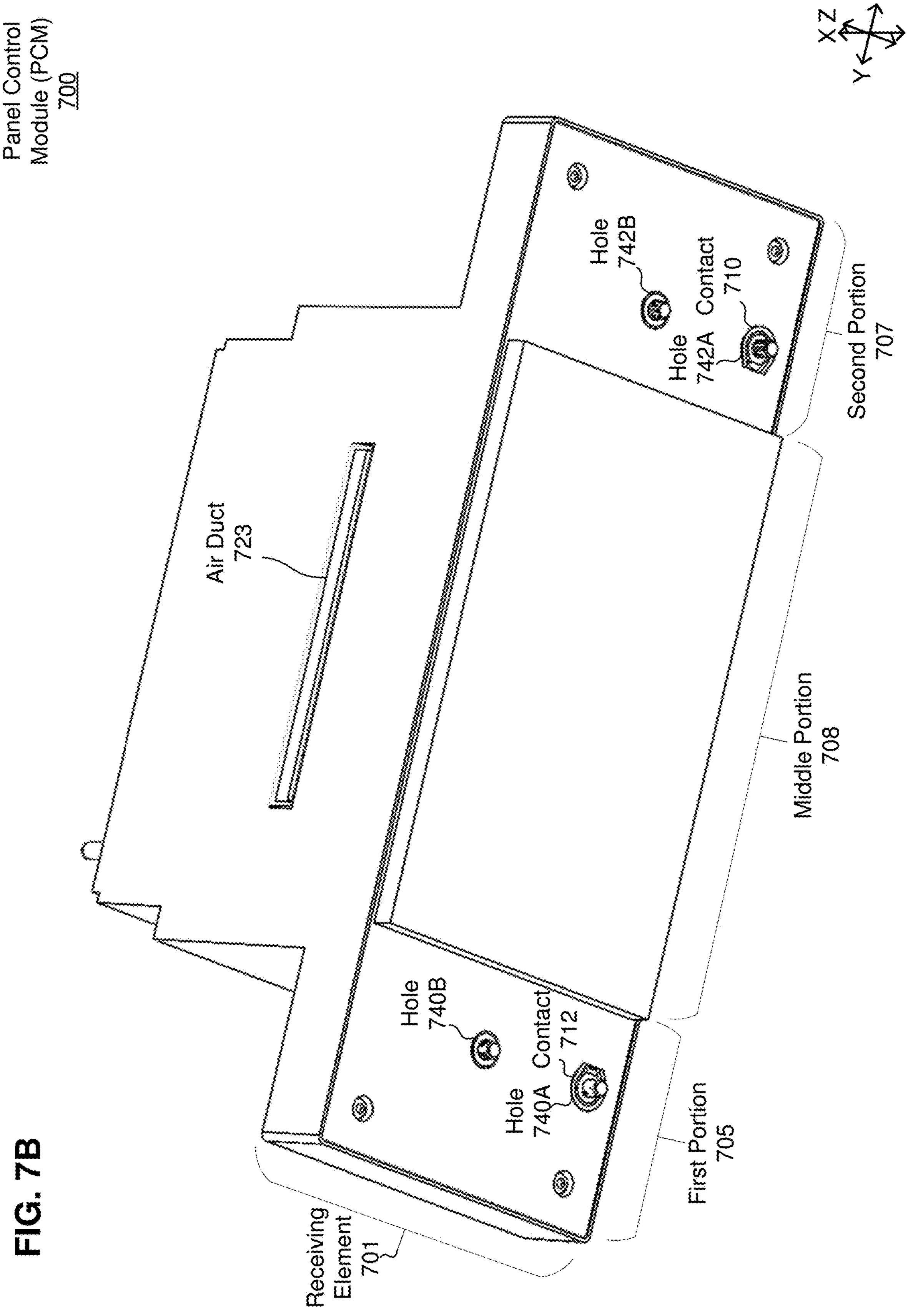

In some embodiments, the electrical panel 100 includes a PCM (panel control module) 700. The PCM 700 is a modular electrical component that may be installed in a receiving compartment of the spine 400. Since the example PCM 700 is wider than other modules, the PCM 700 may be installed on the wide receiving compartment of spine 400 (at the bottom portion). FIGS. 7A-B ("FIG. 7" collectively) are diagrams of an example PCM (panel control module) 700. FIG. 7A is a perspective diagram of the PCM 700 illustrating the front side of the module 700. FIG. 7B is a perspective diagram of the PCM 700 illustrating the back side of the module 700 (that engages with the spine 400).

In general, the PCM 700 manages control of the electrical panel 100. For example, the PCM 700 performs computations (e.g., for powerup functionalities) and provides power to the other modules on the panel 100. The PCM 700 includes a user interface (UI) bar 745 which may give users (e.g., a homeowner) the ability to read the state of the panel 100 and interact with and control the panel 100.

Figure 7C:
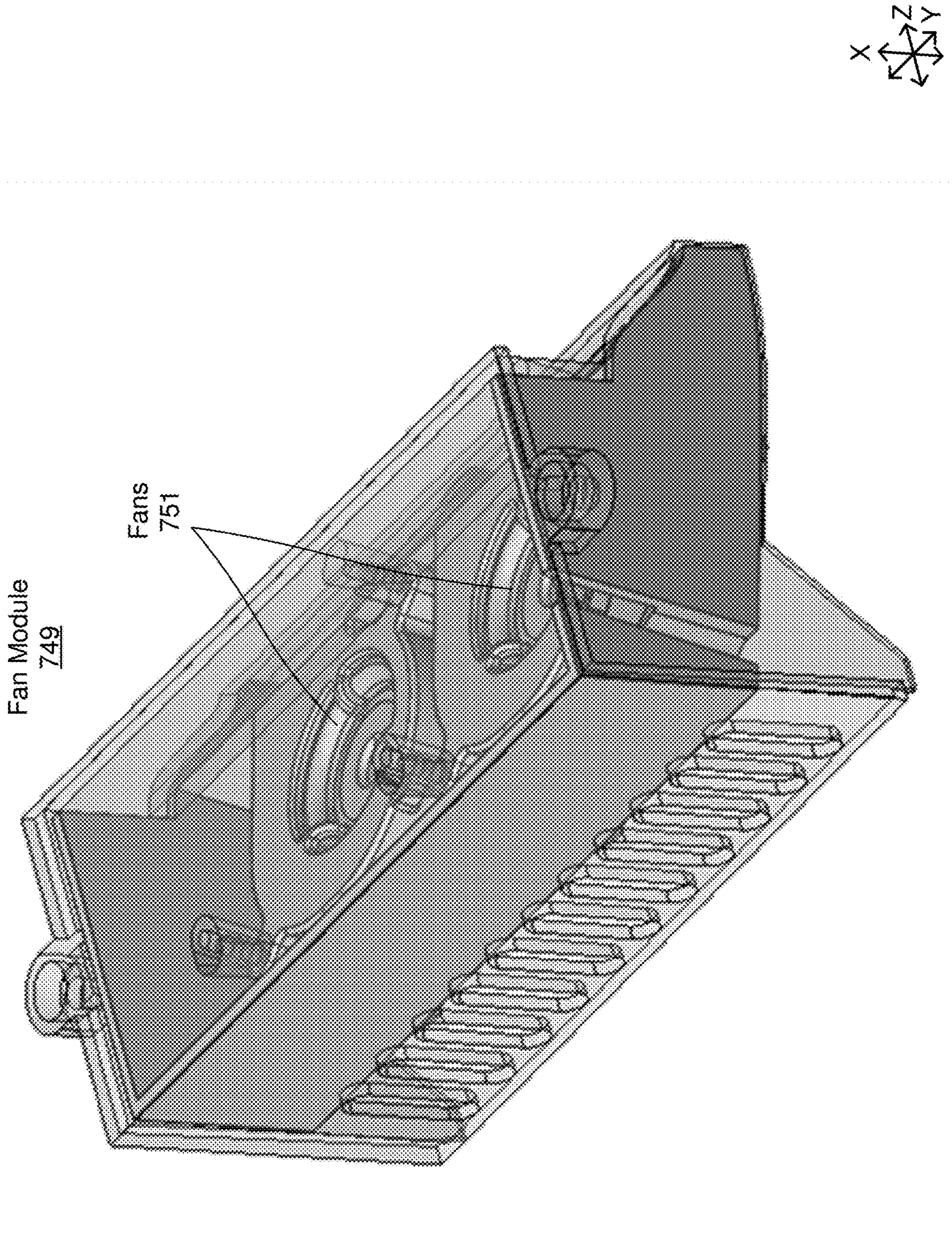
FIG. 7C is a perspective diagram of an example fan module that fits into the PCM.

As previously discussed, the PCM 700 includes a fan module 749. FIG. 7C is a transparent perspective diagram of an example fan module 749 that fits into the PCM 700. The fan module 749 includes two fans that create airflow through air duct 723 to increase dissipation throughout the panel 100.

Similar to the receiving element 501 and the receiving element 601, the receiving element 701 of the PCM 700 includes a first portion 705, a middle portion 708, a second portion 707, an air duct 723, electrical contacts 710, 712, a port for a wired connection, and holes 742A-B, 740A-B with similar mechanical configurations and functionalities (note that in FIG. 7B, bolts are in holes 740A-B, 742A-B). Due to this, descriptions of these components are omitted for brevity. That being said, note that the PCM 700 does not include track indentations since the PCM 700 is shaped to slide into the wide receiving compartment of the spine 400.

Example Gateway Modules

Figure 8:
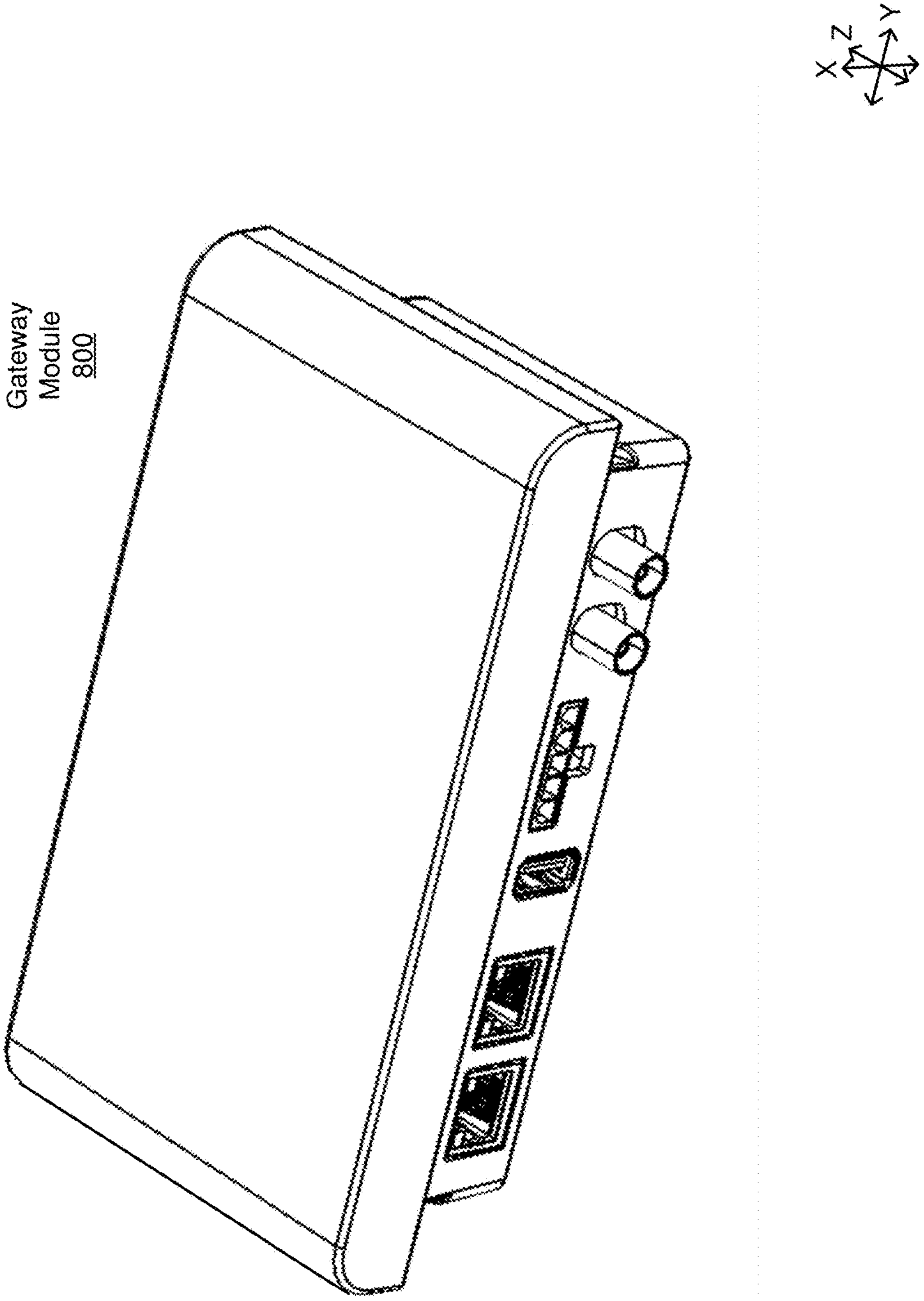
FIG. 8 is a perspective diagram of an example gateway module 800.

In some embodiments, the panel 100 includes a gateway module that couples to the PCM 700. FIG. 8 is a perspective diagram of an example gateway module 800. The gateway module 800 is a site controller for a building (e.g., a residential home). If the building includes multiple panels, the gateway module 800 can receive and aggregate data from the multiple panels and determine building-wide control decisions and reports (thus, a building with multiple panels may only use a single gateway module). For example, the gateway module 800 determines decisions for powerup and can send panel reports to a cloud server (pending user permissions). The gateway module 800 may include computer components associated with the above functions, such as a set of processors, a computer readable medium, and antennas.

Example Lug Modules

Figure 9A:
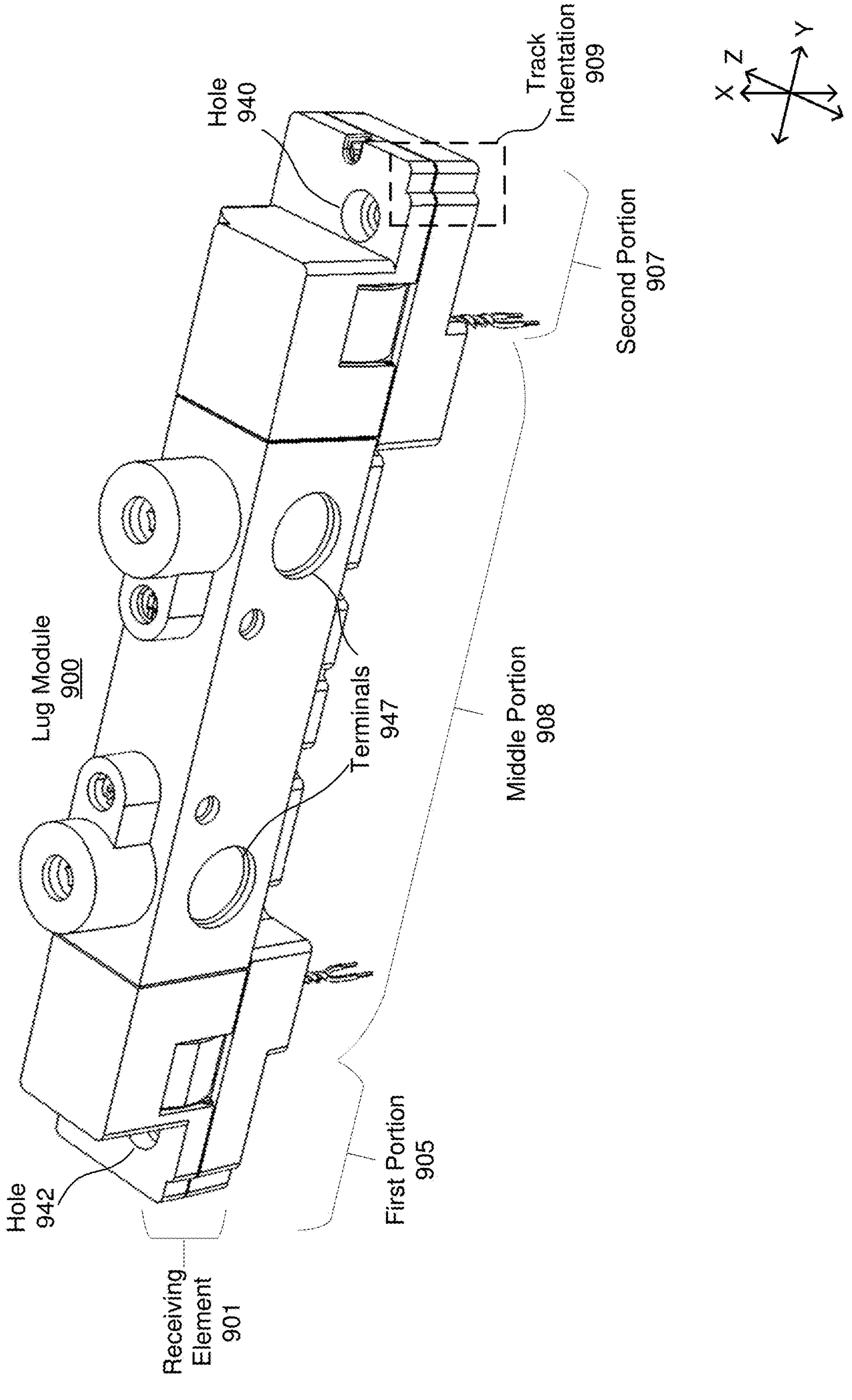
FIGS. 9A-D are diagrams of an example lug module.
Figure 9B:
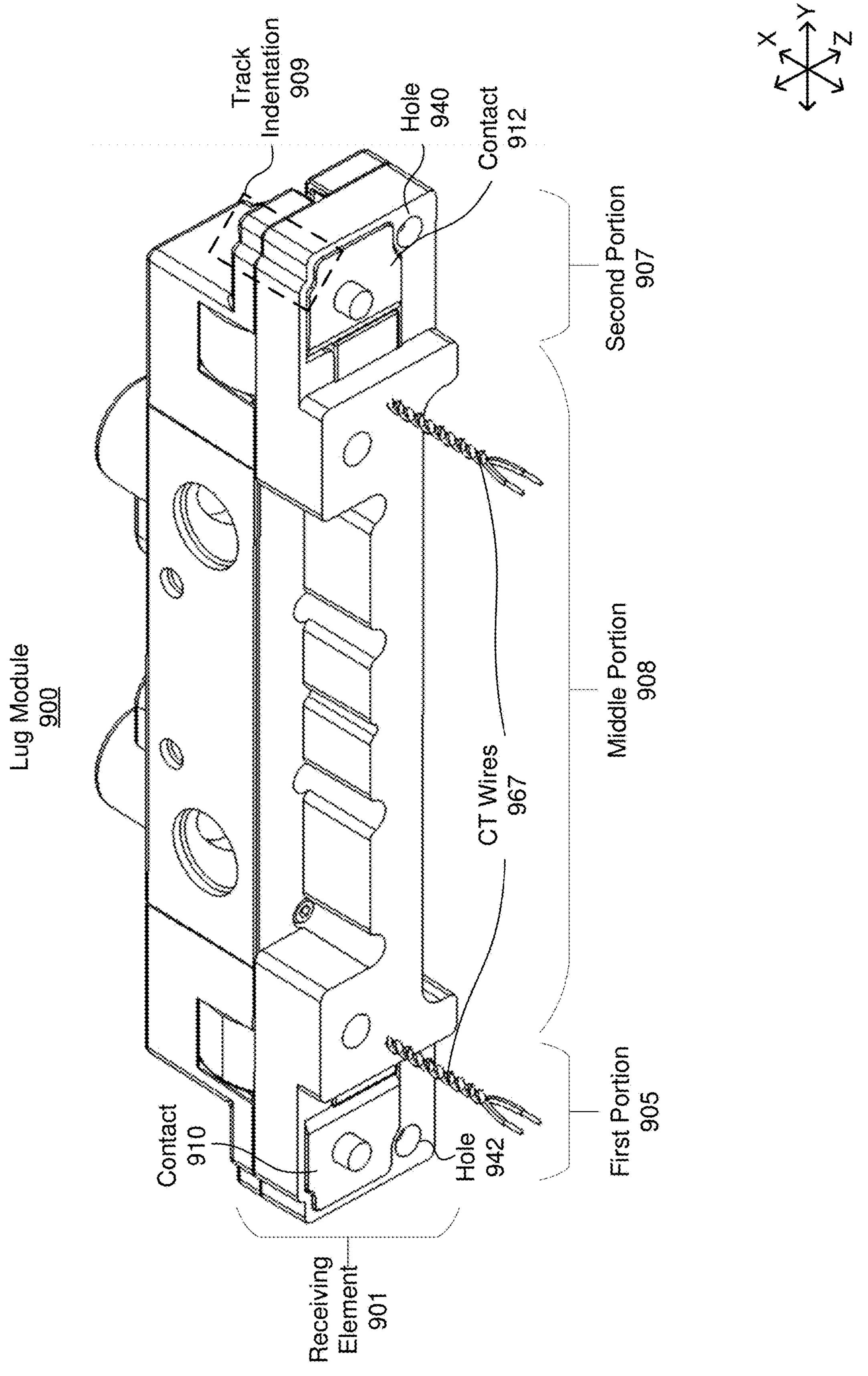
Figure 9C:
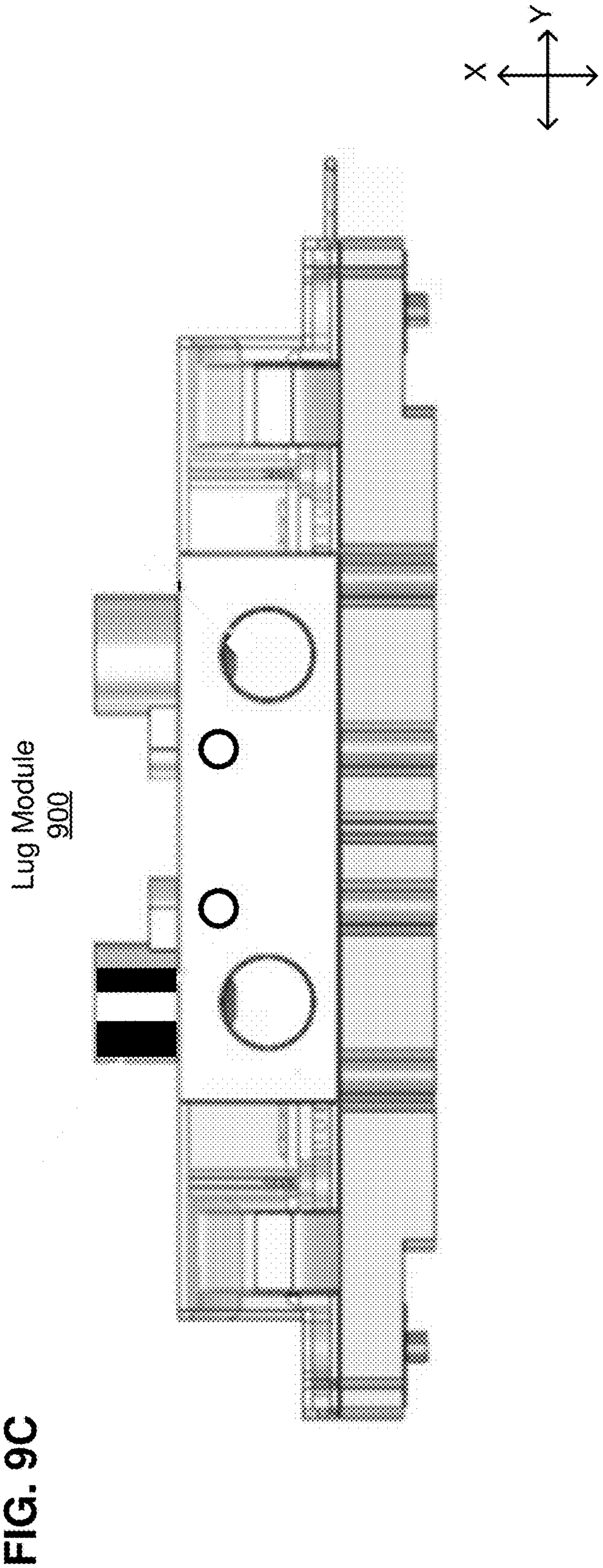
Figure 9D:
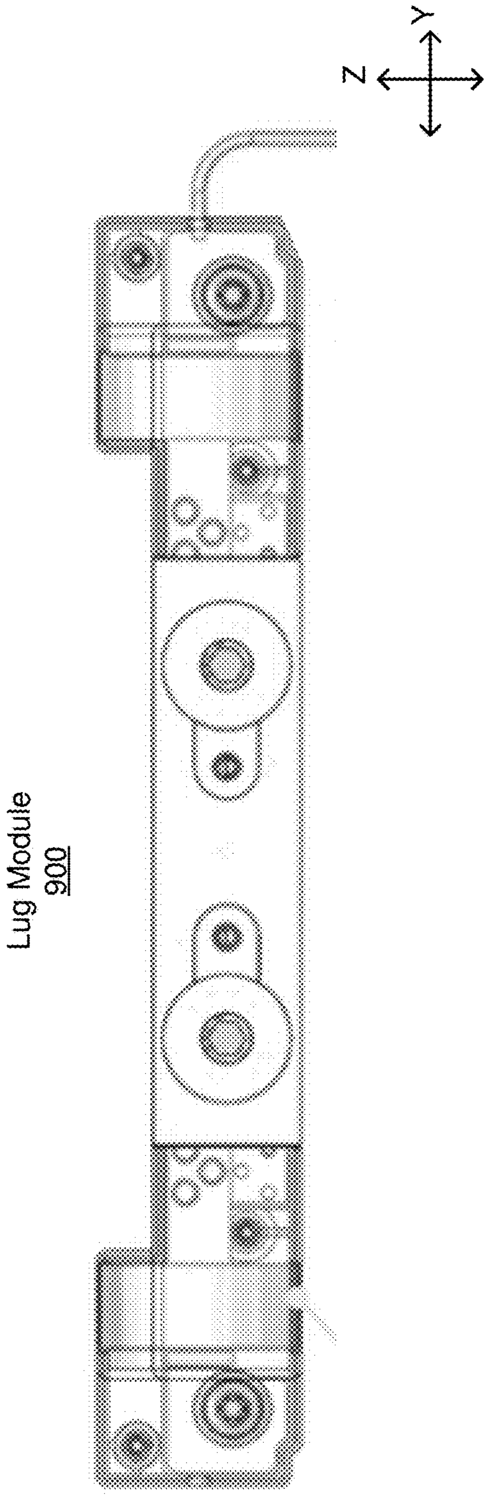
Figure 9E:
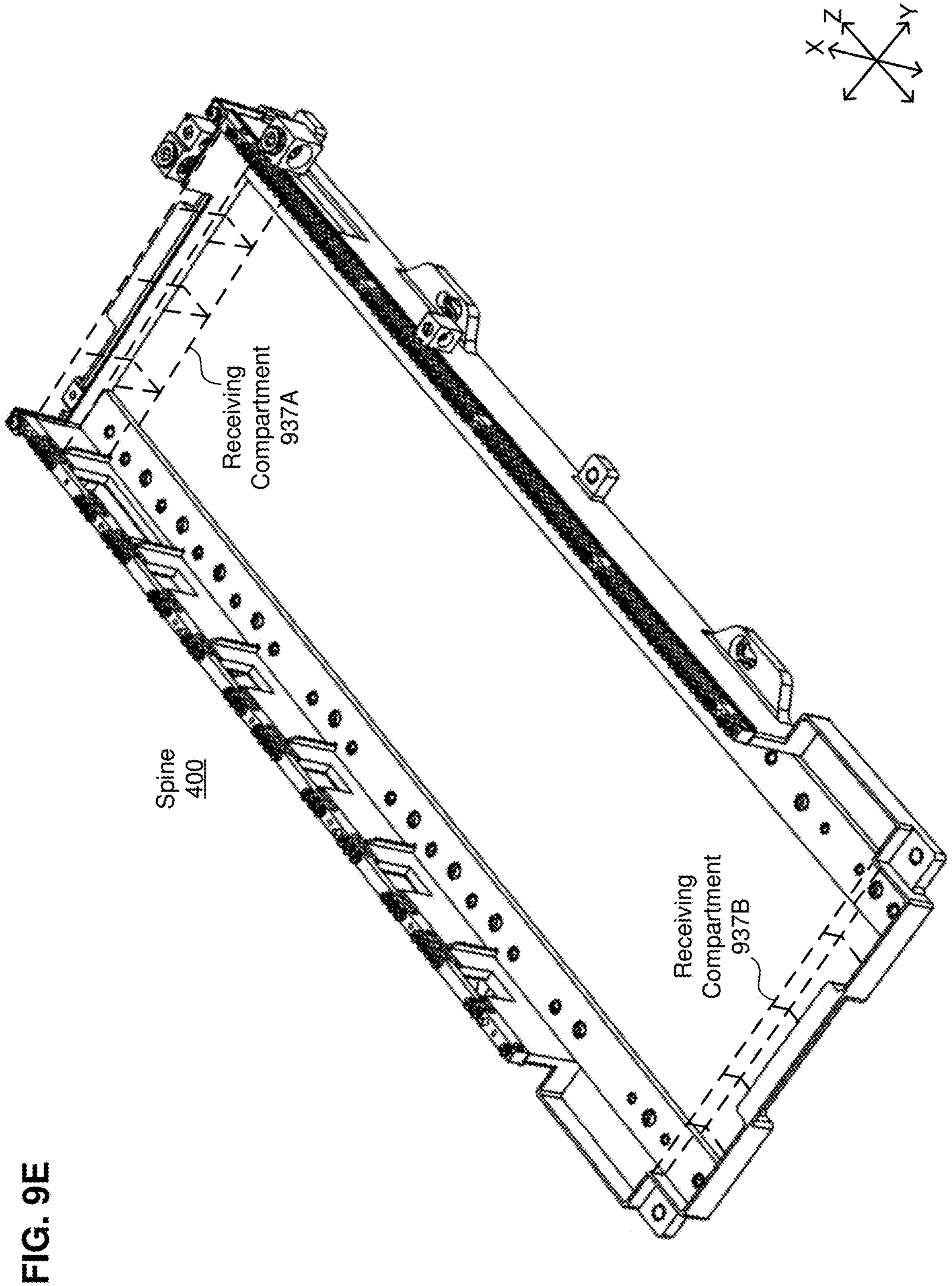
FIG. 9E is a diagram illustrating example lug module receiving compartments of the spine.

In some embodiments, the electrical panel 100 includes a lug module 900. The lug module 900 is a modular electrical panel component that may be installed into one (e.g., of several) of receiving compartments of the spine 400. FIGS. 9A-D are diagrams of an example lug module 900. Specifically, FIG. 9A is a perspective diagram of the lug module 900 illustrating the front side of the module 900. FIG. 9B is a perspective diagram of the lug module 900 illustrating the back side of the module 900 (that engages with the spine 400). FIG. 9C is a lateral side view of the module 900, and FIG. 9D is a front view of the module 900. FIG. 9E is a diagram illustrating example lug module receiving compartments 937A-B of the spine 400. Note that FIGS. 9A-E may collectively be referred to as FIG. 9.

The panel 100 may include a lug module 900 when the panel doesn't include a mains module 500. The lug module 900 provides power from the feeder wires to the bus bars 413, 415. To do this, the lug module 900 may be installed in a top receiving compartment 937A or a bottom receiving compartment 937B of the spine 400. Since the lug module 900 is typically smaller (along that z-axis) than other modules (e.g., a branch module 600), the receiving compartments 937A-B may be smaller (along the z-axis) to accommodate lug modules. The lug module 900 includes terminals 947 for the feeder wires and electrical contacts 910, 912 to power the bus bars 413, 415. In some embodiments, the lug module 900 is a metered lug (e.g., the CT wires 967 transmit current measurement data (e.g., to the PCM module)), which allows it to provide powerup functionality. The lug module 900 may be rated up to 200 amps.

Similar to receiving elements 501 and 601, the receiving element 901 of the lug module 900 includes a first portion 905, a middle portion 908, a second portion 907, track indentations (e.g., 909), electrical contacts 910, 912 (two in total), and holes 942, 940 (two in total) with similar mechanical configurations and functionalities. Due to this, descriptions of these components are omitted for brevity.

Although the above module descriptions with respect to FIGS. 5-7 and 9 describe many features, an electrical module is not required to include all of these features. For example, some electrical module embodiments may not include: a first portion (e.g., 505), a second portion (e.g., 507), a middle portion (e.g., 508), holes (e.g., 540, 542), track indentations (e.g., 509), contacts (e.g., 510, 512), or some combination thereof. Furthermore, features of a module are not required to have the same shape as the features illustrated in FIGS. 5-7 and 9.

Additional Spine Examples

Although FIG. 4 provides an example spine 400, the below paragraphs describe additional example spines. The spines described below may omit features illustrated in FIG. 4 and/or include features that are in addition to or alternative to the features illustrated in FIG. 4.

In some embodiments, a spine (e.g., 400) of a chassis (e.g., electrical panel 100) includes receiving compartments (e.g., 437) configured to receive chassis modules (e.g., 500, 600, 700, 900). Each receiving compartment is formed by (a) a portion of a panel (e.g., 411); (b) a portion of a wall (e.g., 407) raised from a first edge (e.g., 419) of the panel and extending along the first edge; (c) portions of two bus bars (e.g., 413, 415) spaced apart from each other and fixed to the panel; and (d) guiding structures (e.g., 433) extending from a surface of the first wall. The guiding structures (a) engage with chassis modules and (b) prevent the received chassis modules from sliding into an adjacent receiving compartment.

In some embodiments, a spine (e.g., 400) of a chassis (e.g., electrical panel 100) includes: (a) a back panel (e.g., 411); (b) a side wall (e.g., 435) extending from an edge (e.g., 419) of the back panel; (c) two bus bars (e.g., 413, 415) that are spaced apart from each other, fixed to the back panel, and run parallel to the side wall; and (d) guide structures (e.g., 433) extending from the side wall and/or at fixed positions relative to the bus bars. The guide structures define receiving compartments (e.g., 437) for attaching chassis modules (e.g., 500, 600, 700, 900) across the two bus bars, and the receiving compartments are configured for field installation of the chassis modules.

In some embodiments, a spine (e.g., 400) of a chassis (e.g., electrical panel 100) includes: (a) a back panel (e.g., 411); (b) two bus bars (e.g., 413, 415) that are spaced apart from each other, fixed to the back panel, and run parallel to the side wall; and (d) guide structures (e.g., 433) located at fixed positions relative to the bus bars. The guide structures define receiving compartments (e.g., 437) for attaching chassis modules (e.g., 500, 600, 700, 900) across the two bus bars, and the receiving compartments are configured for field installation of the chassis modules.

In some embodiments, a spine (e.g., 400) of a chassis (e.g., electrical panel 100) includes: (a) a back panel (e.g., 411); (b) a side wall (e.g., 435) extending from an edge (e.g., 419) of the back panel; (c) two bus bars (e.g., 413, 415) that are spaced apart from each other, fixed to the back panel, and run parallel to the side wall; and (d) guide structures (e.g., 433) extending from the side wall. The guide structures define receiving compartments (e.g., 437) for attaching chassis modules (e.g., 500, 600, 700, 900) across the two bus bars. The receiving compartments are for field installation of the chassis modules. For each receiving compartment: the two bus bars contain a hole pattern for attachment of the chassis module to the two bus bars, and the side wall includes an opening (e.g., 435) to pass an electrical connection that provides data and/or power to the chassis module.

In some embodiments, a spine (e.g., 400) of a chassis (e.g., electrical panel 100) includes: (a) a back panel (e.g., 411); (b) two bus bars (e.g., 413, 415) spaced apart from each other and fixed to the back panel, each bus bar including holes along a length of the bus bar and aligned with holes on the other bus bar, where a set of aligned holes are configured to receive bolts that hold a chassis module in physical contact to the bus bars; (c) a wall (e.g., 407) raised from a first edge (e.g., 419) of the back panel and extending along the first edge. The wall includes cavities (e.g., 435) spaced along the length of the wall and at locations relative to holes of the bus bars.

In some embodiments, one or more (e.g., each) receiving compartment is additionally formed by a portion of a second wall (e.g., 409) raised from a second edge (e.g., 417) of the panel and extending along the second edge. Each receiving compartment may be additionally formed by one or more guiding structures extending from a surface of the second wall facing the first wall (e.g., 407).

The spine (e.g., 400) may further include a neutral bus bar (e.g., 429) or a ground bus bar (e.g., 431) fixed to a top surface of the wall (e.g., 407 or 409).

The guiding structures may be configured to engage with an outer surface of a chassis module (e.g., an outer surface of receiving element). For example, guiding structures are configured to engage with track indentations (e.g., 509, 609, 909) of chassis modules.

Additional Module Examples

Although FIGS. 5-7 and 9 provide example modules, the below paragraphs describe additional example modules. The modules described below may omit features illustrated in FIGS. 5-7 and 9 and/or include features that are in addition to or alternative to the features illustrated in FIGS. 5-7 and 9.

In some embodiments, a chassis module (e.g., 500, 600, 700, 900) for a chassis (e.g., a modular electrical panel 100) includes an insertion element (e.g., 501, 601, 701, 901) configured to slide into one of a plurality of receiving compartments (e.g., 437) of a spine (e.g., 400) of the chassis. The insertion element includes: a first electrical contact (e.g., 510, 610, 910), a first hole (e.g., 542, 642, 942), a second electrical contact (e.g., 512, 612, 912), and a second hole (e.g., 540, 640, 940). The first contact is on a first side of the insertion element (e.g., on a first portion 505, 605, 905) and is configured to physically contact a first bus bar (e.g., 413) of the spine. The first hole is on the first side of the insertion element and may be configured to receive a first bolt (or screw) that holds the first electrical contact in physical contact to the first bus bar. The second electrical contact is on a second side of the insertion element opposite the first side (e.g., on the second portion 507, 607, 907). The second electrical contact is configured to contact a second bus bar (e.g., 415) of the spine. The second hole is on the second side of the insertion element and is configured to receive a second bolt (or screw) that holds the second electrical contact in physical contact to the second bus bar.

In some embodiments, a chassis module (e.g., 500, 600, 700, 900) is configured for installation at any of a plurality of receiving compartments (e.g., 437) of a spine (e.g., 400) of a chassis (e.g., 100). The spine includes two bus bars (e.g., 413, 415). The chassis module includes two bus bar contacts (e.g., 510, 512) and a port. The bus bar contacts are on a bottom of the chassis module (e.g., at a receiving element 501, 601, 901), where each of the two bus bar contacts physically contact the corresponding bus bar of the spine, and the bus bar contacts and the bus bars have (e.g., standard and/or repeating) hole patterns for attachment of the chassis module to the spine at the receiving compartment. The port is for attachment of a data and/or power connection to the chassis module. The port may be accessible after attachment of the chassis module to the spine (e.g., via holes (e.g., 435) in wall 407). In some embodiments (e.g., when the chassis module is a branch module (e.g., 600)), the chassis module includes attachment points (e.g., stab 611) for (e.g., eight) branch circuits, where the chassis module distributes electricity from the bus bars to the branch circuits.

ADDITIONAL CONSIDERATIONS

Other aspects from the above descriptions and sections include components, devices, systems, improvements, methods, processes, applications, computer readable mediums, and other technologies related to any of the above.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the apparatus disclosed herein without departing from the spirit and scope as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device to address every problem that is solvable by different embodiments of the invention in order to be encompassed by the claims.

The term "coupling" is not meant to exclude intervening elements. For example, when two elements are described as being coupled to each other, this does not imply that the elements are directly coupled to each other nor does it preclude the use of other elements between the two.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A spine of a chassis, the spine comprising:

receiving compartments configured to receive chassis modules, each receiving compartment formed by:

- a portion of a panel;
- a portion of a first wall raised from a first edge of the panel and extending along the first edge;
- a portion of a second wall raised from a second edge of the panel and extending along the second edge;
- portions of two bus bars spaced apart from each other and fixed to the panel;
- one or more guiding structures extending from a first surface of the first wall toward the second wall, the first surface facing the second wall, the one or more guiding structures configured to (a) engage with chassis modules and (b) prevent the received chassis modules from sliding into an adjacent receiving compartment; and
- a neutral bus bar or a ground bus bar fixed to a top surface of the first wall different than the first surface.

2. The spine of claim 1, wherein the chassis is an electrical panel.

3. The spine of claim 1, wherein the receiving compartments are for attaching chassis modules across the two bus bars.

4. The spine of claim 1, wherein the receiving compartments are configured for field installation of the chassis modules.

5. The spine of claim 1, wherein the one or more guiding structures are at fixed positions relative to the two bus bars.

6. The spine of claim 1, wherein the two bus bars run parallel to each other.

7. The spine of claim 1, wherein each receiving compartment is additionally formed by one or more guiding structures extending from a surface of the second wall facing the first wall.

8. The spine of claim 1, wherein each bus bar includes holes along a length of the bus bar and aligned with holes on the other bus bar, and a set of aligned holes are configured to receive bolts that hold a chassis module in physical contact to the bus bars.

9. The spine of claim 1, wherein the two bus bars contain a hole pattern for attachment of the chassis modules to the two bus bars.

10. The spine of claim 1, wherein the first surface of the first wall facing the second wall includes cavities spaced along the length of the first wall and at locations aligned with the receiving compartments.

11. The spine of claim 1, wherein the one or more guiding structures are tabs.

12. The spine of claim 1, wherein the one or more guiding structures engage with an outer surface of a chassis module.

13. The spine of claim 12, wherein the one or more guiding structures are configured to engage with track indentations of chassis modules.

14. A spine of a chassis, the spine comprising:

a back panel;

two bus bars spaced apart from each other and fixed to the back panel, each bus bar including holes along a length of the bus bar and aligned with holes on the other bus bar, a set of aligned holes configured to receive bolts that hold a chassis module in physical contact to the bus bars;

a first wall raised from a first edge of the back panel and extending along the first edge;

a second wall raised from a second edge of the back panel;

guiding structures extending from a first surface of the first wall toward the second wall, the first surface facing the second wall, the guiding structures defining receiving compartments for attaching chassis modules across the two bus bars; and a neutral bus bar or a ground bus bar fixed to a top surface of the first wall different than the first surface, wherein the first surface of the first wall includes cavities spaced along the length of the first wall and at locations aligned with the receiving compartments.

15. The spine of claim 14, wherein the guiding structures are configured to (a) engage with chassis modules and (b) prevent the received chassis modules from sliding into an adjacent receiving compartment.

16. The spine of claim 15, wherein the guiding structures are tabs.

17. The spine of claim 14, wherein the receiving compartments are configured for field installation of the chassis modules and for each receiving compartment: the two bus bars contain a hole pattern for attachment of the chassis module to the two bus bars, and the first wall includes an opening to pass an electrical connection that provides data to the chassis module.

18. A spine of a chassis, the spine comprising:

a back panel;

a first side wall extending from an edge of the back panel;

a second side wall extending from a second edge of the back panel;

two bus bars that are spaced apart from each other, fixed to the back panel, and run parallel to the first side wall;

guiding structures extending from a first surface of the first side wall toward the second side wall, the first surface facing the second side wall, the guiding structures defining receiving compartments for attaching chassis modules across the two bus bars; and a neutral bus bar or ground bud bar fixed to a top surface of the first side wall different than the first surface, wherein the receiving compartments are configured for field installation of the chassis modules and for each receiving compartment: the two bus bars contain a hole pattern for attachment of the chassis module to the two bus bars, and the first side wall includes an opening to pass an electrical connection that provides data to the chassis module.

* * * * *